(12) United States Patent
Lee et al.

(10) Patent No.: US 11,753,222 B2
(45) Date of Patent: *Sep. 12, 2023

(54) POWDERED POUCH AND METHOD OF MAKING SAME

(71) Applicant: MONOSOL, LLC, Merrillville, IN (US)

(72) Inventors: David M. Lee, Clemmons, NC (US); Yashodhan S. Parulekar, Crown Point, IN (US)

(73) Assignee: MONOSOL, LLC, Merrillville, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/915,883

(22) Filed: Jun. 29, 2020

(65) Prior Publication Data

US 2020/0331678 A1 Oct. 22, 2020

Related U.S. Application Data

(63) Continuation of application No. 15/858,644, filed on Dec. 29, 2017, now Pat. No. 10,696,460, which is a continuation of application No. 15/214,197, filed on Jul. 19, 2016, now Pat. No. 9,908,675, which is a continuation of application No. 13/828,299, filed on Mar. 14, 2013, now Pat. No. 9,394,092.

(Continued)

(51) Int. Cl.
*B65D 65/46* (2006.01)
*B65D 30/08* (2006.01)
(Continued)

(52) U.S. Cl.
CPC ............... *B65D 65/46* (2013.01); *B32B 1/02* (2013.01); *B32B 27/28* (2013.01); *B32B 27/285* (2013.01);
(Continued)

(58) Field of Classification Search
CPC ......... B32B 1/02; B32B 27/28; B32B 27/285; B32B 27/286; B32B 27/30; B32B 27/302;
(Continued)

(56) References Cited

U.S. PATENT DOCUMENTS 3,186,869 A 6/1965 Friedman
3,728,739 A 4/1973 Semp
(Continued)

FOREIGN PATENT DOCUMENTS

EP 0218272 A1 4/1987
EP 0260105 A2 3/1988
(Continued)

OTHER PUBLICATIONS

"BonuWax™ Anti-Sticking Agent," BIOGRUND GmbH, Germany (2013).
(Continued)

*Primary Examiner* — James C Yager
(74) *Attorney, Agent, or Firm* — MARSHALL, GERSTEIN & BORUN LLP

(57) ABSTRACT

Disclosed herein are water-soluble films and resulting packets including a water-soluble film coated by a powder, wherein the powder includes a mixture of a powdered lubricant and an active agent. Optionally, the active agent may be encapsulated, e.g. microencapsulated, for release of the active agent through mechanisms including, but not limited to, mechanical rupture, melt, ablation, dissolution, diffusion, biodegradation, or pH-controlled release. Active ingredients described include enzymes, oils, flavors, colorants, odor absorbers, fragrances, pesticides, fertilizers, activators, acid catalysts, metal catalysts, ion scavengers, bleaches, bleach components, fabric softeners and combinations thereof. Examples of packet fills include laundry detergents, bleach and laundry additives, fabric care, dishwashing, hard surface cleaning, beauty care, skin care, other personal care, and foodstuffs.

26 Claims, 1 Drawing Sheet

Plot of odor perceived by sensory panel vs. pouch type.

Related U.S. Application Data

(60) Provisional application No. 61/624,926, filed on Apr. 16, 2012.

(51) Int. Cl.

| | | |
|---|---|---|
| *B65D 37/00* | (2006.01) | |
| *C08J 7/06* | (2006.01) | |
| *C11D 17/04* | (2006.01) | |
| *C11D 3/50* | (2006.01) | |
| *C08J 7/04* | (2020.01) | |
| *B32B 27/30* | (2006.01) | |
| *B32B 1/02* | (2006.01) | |
| *B32B 27/28* | (2006.01) | |
| *B32B 27/36* | (2006.01) | |
| *B32B 27/42* | (2006.01) | |
| *B32B 27/38* | (2006.01) | |
| *C09D 1/02* | (2006.01) | |
| *C09D 103/02* | (2006.01) | |

(52) U.S. Cl.
CPC ............ *B32B 27/286* (2013.01); *B32B 27/30* (2013.01); *B32B 27/302* (2013.01); *B32B 27/306* (2013.01); *B32B 27/308* (2013.01); *B32B 27/36* (2013.01); *B32B 27/38* (2013.01); *B32B 27/42* (2013.01); *B65D 31/02* (2013.01); *B65D 37/00* (2013.01); *C08J 7/042* (2013.01); *C08J 7/0423* (2020.01); *C08J 7/06* (2013.01); *C08J 7/065* (2013.01); *C09D 1/02* (2013.01); *C09D 103/02* (2013.01); *C11D 3/505* (2013.01); *C11D 17/042* (2013.01); *C11D 17/043* (2013.01); *C11D 17/044* (2013.01); *C08J 7/0427* (2020.01); *C08J 2300/14* (2013.01); *Y02W 90/10* (2015.05); *Y10T 428/1324* (2015.01); *Y10T 428/1334* (2015.01); *Y10T 428/1341* (2015.01); *Y10T 428/1345* (2015.01); *Y10T 428/1352* (2015.01); *Y10T 428/1372* (2015.01); *Y10T 428/1379* (2015.01)

(58) Field of Classification Search
CPC ..... B32B 27/306; B32B 27/308; B32B 27/36; B32B 27/38; B32B 27/42; C08J 7/04; C08J 7/045; C08J 7/047; C08J 7/06; C08J 7/065; C08J 7/042; C08J 7/0423; C08J 7/0427; C08J 2300/14; B65D 37/00; B65D 65/46; B65D 65/42; B65D 83/06; B65D 85/04; B65D 31/02; C09D 1/02; C09D 103/02; C11D 3/505; C11D 17/042; C11D 17/043; C11D 17/044; Y02W 90/10; Y10T 428/1324; Y10T 428/1334; Y10T 428/1341; Y10T 428/1345; Y10T 428/1352; Y10T 428/1372; Y10T 428/1379
See application file for complete search history.

(56) References Cited

U.S. PATENT DOCUMENTS

| | | |
|---|---|---|
| 3,762,454 A | 10/1973 | Wilkins, Jr. |
| 4,062,647 A | 12/1977 | Storm et al. |
| 4,115,292 A | 9/1978 | Richardson et al. |
| 4,176,079 A | 11/1979 | Guerry et al. |
| 4,291,071 A | 9/1981 | Harris et al. |
| 4,375,416 A | 3/1983 | Crisp et al. |
| 4,435,307 A | 3/1984 | Barbesgaard et al. |
| 4,534,981 A | 8/1985 | Zabotto et al. |
| 4,664,064 A | 5/1987 | Lowe |
| 4,760,025 A | 7/1988 | Estell et al. |
| 4,810,414 A | 3/1989 | Huge-Jensen et al. |
| 5,002,789 A | 3/1991 | Graf et al. |
| 5,112,688 A | 5/1992 | Michael |
| 5,145,842 A | 9/1992 | Driedger et al. |
| 5,155,033 A | 10/1992 | Estell et al. |
| 5,182,204 A | 1/1993 | Estell et al. |
| 5,185,258 A | 2/1993 | Caldwell et al. |
| 5,204,015 A | 4/1993 | Caldwell et al. |
| 5,232,612 A | 8/1993 | Trinh et al. |
| 5,244,791 A | 9/1993 | Estell |
| 5,264,366 A | 11/1993 | Ferrari et al. |
| 5,288,627 A | 2/1994 | Nielsen et al. |
| 5,290,694 A | 3/1994 | Nakanishi et al. |
| RE34,606 E | 5/1994 | Estell et al. |
| 5,310,675 A | 5/1994 | Estell et al. |
| 5,316,941 A | 5/1994 | Estell et al. |
| 5,346,823 A | 9/1994 | Estell et al. |
| 5,352,594 A | 10/1994 | Poulouse |
| 5,371,008 A | 12/1994 | Carter et al. |
| 5,371,190 A | 12/1994 | Carter et al. |
| 5,384,364 A | 1/1995 | Besse et al. |
| 5,411,873 A | 5/1995 | Adams et al. |
| 5,427,936 A | 6/1995 | Moeller et al. |
| 5,441,882 A | 8/1995 | Estell et al. |
| 5,443,750 A | 8/1995 | Convents et al. |
| 5,457,046 A | 10/1995 | Woldike et al. |
| 5,472,855 A | 12/1995 | Carter et al. |
| 5,520,838 A | 5/1996 | Baeck et al. |
| 5,536,661 A | 7/1996 | Boel et al. |
| 5,648,096 A | 7/1997 | Gander et al. |
| 5,648,263 A | 7/1997 | Schulein et al. |
| 5,652,136 A | 7/1997 | Carter et al. |
| 5,658,871 A | 8/1997 | Batenburg et al. |
| 5,668,073 A | 9/1997 | Convents et al. |
| 5,686,593 A | 11/1997 | Woldike et al. |
| 5,691,178 A | 11/1997 | Schulein et al. |
| 5,693,520 A | 12/1997 | Branner et al. |
| 5,700,676 A | 12/1997 | Bott et al. |
| 5,763,254 A | 6/1998 | Woldike et al. |
| 5,763,257 A | 6/1998 | Bott et al. |
| 5,766,912 A | 6/1998 | Boel et al. |
| 5,776,757 A | 7/1998 | Schulein et al. |
| 5,792,641 A | 8/1998 | Schulein et al. |
| 5,801,038 A | 9/1998 | Bott et al. |
| 5,824,532 A | 10/1998 | Barnett et al. |
| 5,827,718 A | 10/1998 | Ishida et al. |
| 5,849,549 A | 12/1998 | Barnett et al. |
| 5,858,757 A | 1/1999 | Von Der Osten et al. |
| 5,863,759 A | 1/1999 | Boel et al. |
| 5,869,438 A | 2/1999 | Svendsen et al. |
| 5,874,558 A | 2/1999 | Boel et al. |
| 5,892,013 A | 4/1999 | Svendsen et al. |
| 5,912,157 A | 6/1999 | von der Osten et al. |
| 5,919,691 A | 7/1999 | Schulein et al. |
| 5,939,315 A | 8/1999 | Adams et al. |
| 5,942,431 A | 8/1999 | Yoneda et al. |
| 5,948,672 A | 9/1999 | Rasmussen et al. |
| 5,955,340 A | 9/1999 | Bott et al. |
| 5,965,384 A | 10/1999 | Boel et al. |
| 5,972,682 A | 10/1999 | Bott et al. |
| 5,976,855 A | 11/1999 | Svendsen et al. |
| 6,001,639 A | 12/1999 | Schulein et al. |
| 6,020,180 A | 2/2000 | Svendsen et al. |
| 6,071,735 A | 6/2000 | Schulein et al. |
| 6,074,863 A | 6/2000 | Svendsen et al. |
| 6,093,562 A | 7/2000 | Bisgård-Frantzen et al. |
| 6,114,296 A | 9/2000 | Schulein et al. |
| 6,117,664 A | 9/2000 | Schulein et al. |
| 6,159,731 A | 12/2000 | Yang et al. |
| 6,297,037 B1 | 10/2001 | Barnett et al. |
| 6,297,038 B1 | 10/2001 | Bisgård-Frantzen et al. |
| 6,300,116 B1 | 10/2001 | von der Osten et al. |
| 6,387,690 B1 | 5/2002 | Schulein et al. |
| 6,423,524 B1 | 7/2002 | Hagen et al. |
| 6,458,754 B1 | 10/2002 | Velazguez et al. |
| 6,465,235 B1 | 10/2002 | Bott et al. |
| 6,485,736 B1 | 11/2002 | Shirley et al. |
| 6,506,589 B1 | 1/2003 | Hastrup et al. |
| 6,579,843 B2 | 6/2003 | Cropper et al. |

(56) References Cited

U.S. PATENT DOCUMENTS

| | | |
|---|---|---|
| 6,808,913 B2 | 10/2004 | Hastrup et al. |
| 6,835,821 B2 | 12/2004 | Hastrup et al. |
| 6,844,302 B1 | 1/2005 | Boden et al. |
| 6,855,531 B2 | 2/2005 | Shulein et al. |
| 6,867,031 B2 | 3/2005 | Bisgard-Frantzen et al. |
| 6,924,258 B2 | 8/2005 | Delamarche et al. |
| 7,067,575 B2 | 6/2006 | Kitamura et al. |
| 7,098,017 B2 | 8/2006 | von der Osten et al. |
| 7,226,773 B2 | 6/2007 | Schulein et al. |
| 7,517,668 B1 | 4/2009 | Boel et al. |
| 7,517,847 B2 | 4/2009 | Catalfamo et al. |
| 7,871,972 B2 | 1/2011 | SenGupta |
| 7,908,992 B2 | 3/2011 | Rowe et al. |
| 7,977,288 B2 | 7/2011 | SenGupta |
| 7,993,898 B2 | 8/2011 | Andersen et al. |
| 8,017,372 B2 | 9/2011 | Andersen et al. |
| 9,394,092 B2 | 7/2016 | Lee et al. |
| 9,908,675 B2 * | 3/2018 | Lee ................. B32B 27/36 |
| 10,696,460 B2 * | 6/2020 | Lee ..................... B32B 1/02 |
| 2001/0036910 A1 | 11/2001 | Rasmussen et al. |
| 2002/0098996 A1 | 7/2002 | Bisgard-Frantzen et al. |
| 2002/0102702 A1 | 8/2002 | Osten et al. |
| 2002/0165109 A1 | 11/2002 | Cropper et al. |
| 2003/0054539 A1 | 3/2003 | Schulein et al. |
| 2003/0064908 A1 | 4/2003 | Bisgard-Frantzen et al. |
| 2003/0092097 A1 | 5/2003 | Andersen et al. |
| 2003/0100463 A1 | 5/2003 | Delamarche et al. |
| 2003/0119167 A1 | 6/2003 | Rasmussen et al. |
| 2003/0148495 A1 | 8/2003 | Hastrup et al. |
| 2003/0175933 A1 | 9/2003 | Hastrup et al. |
| 2003/0186378 A1 | 10/2003 | Hastrup et al. |
| 2003/0232076 A1 | 12/2003 | Makino et al. |
| 2004/0180086 A1 | 9/2004 | Ramtoola et al. |
| 2004/0253676 A1 | 12/2004 | Bisgard-Frantzen et al. |
| 2005/0003986 A1 | 1/2005 | Hastrup et al. |
| 2005/0009166 A1 | 1/2005 | Andersen et al. |
| 2005/0059131 A1 | 3/2005 | Bisgard-Frantzen et al. |
| 2005/0070003 A1 | 3/2005 | Schulein et al. |
| 2005/0250664 A1 | 11/2005 | Bisgard-Frantzen et al. |
| 2006/0035323 A2 | 2/2006 | Bisgard Frantzen et al. |
| 2006/0083876 A1 | 4/2006 | Catlin et al. |
| 2008/0020220 A1 | 1/2008 | Maurer et al. |
| 2008/0145912 A1 | 6/2008 | Schulein et al. |
| 2008/0206836 A1 | 8/2008 | Andersen et al. |
| 2009/0170747 A1 | 7/2009 | Andersen et al. |
| 2009/0280527 A1 | 11/2009 | Bisgard-Frantzen et al. |
| 2010/0099597 A1 | 4/2010 | Bisgard-Frantzen et al. |
| 2010/0099598 A1 | 4/2010 | Bisgard-Frantzen et al. |
| 2010/0105821 A1 | 4/2010 | Verrall et al. |
| 2010/0107342 A1 | 5/2010 | Schulein et al. |
| 2011/0177990 A1 | 7/2011 | Bisgard-Frantzen et al. |
| 2011/0250674 A1 | 10/2011 | Andersen et al. |
| 2013/0244920 A1 | 9/2013 | Lee et al. |
| 2016/0326325 A1 | 11/2016 | Lee et al. |

FOREIGN PATENT DOCUMENTS

| | | |
|---|---|---|
| EP | 0331376 A2 | 9/1989 |
| EP | 0 338 350 A2 | 10/1989 |
| EP | 0407225 A1 | 1/1991 |
| EP | 0495257 A1 | 7/1992 |
| EP | 0531315 A1 | 3/1993 |
| EP | 0531372 A1 | 3/1993 |
| EP | 1314653 A1 | 5/2003 |
| EP | 1498473 A1 | 1/2005 |
| EP | 1326929 B9 | 3/2012 |
| GB | 1296839 A | 11/1972 |
| GB | 1372034 A | 10/1974 |
| JP | S51-006726 A | 1/1976 |
| JP | S63-112510 A | 5/1988 |
| JP | H02124945 A | 5/1990 |
| JP | H9150407 A | 6/1997 |
| JP | 2001-162708 A | 6/2001 |
| JP | 2004-529243 A | 9/2004 |
| JP | 2008-007749 A | 1/2008 |
| JP | 2008-540743 A | 11/2008 |
| TW | 200914249 A | 4/2009 |
| TW | M401635 U | 4/2011 |
| WO | WO-89/06270 A1 | 7/1989 |
| WO | WO-89/06279 A1 | 7/1989 |
| WO | WO-89/09259 A1 | 10/1989 |
| WO | WO-91/16422 A1 | 10/1991 |
| WO | WO-92/05249 A1 | 4/1992 |
| WO | WO-92/19729 A1 | 11/1992 |
| WO | WO-94/01541 A1 | 1/1994 |
| WO | WO-94/02597 A1 | 2/1994 |
| WO | WO-94/07998 A1 | 4/1994 |
| WO | WO-94/18314 A1 | 8/1994 |
| WO | WO-94/25578 A1 | 11/1994 |
| WO | WO-94/25583 A1 | 11/1994 |
| WO | WO-95/06720 A1 | 3/1995 |
| WO | WO-95/14783 A1 | 6/1995 |
| WO | WO-95/22615 A1 | 8/1995 |
| WO | WO-95/24471 A1 | 9/1995 |
| WO | WO-95/30744 A2 | 11/1995 |
| WO | WO-95/35381 A1 | 12/1995 |
| WO | WO-96/00292 A1 | 1/1996 |
| WO | WO-96/11262 A1 | 4/1996 |
| WO | WO-96/12012 A1 | 4/1996 |
| WO | WO-96/13580 A1 | 5/1996 |
| WO | WO-96/23873 A1 | 8/1996 |
| WO | WO-96/27002 A1 | 9/1996 |
| WO | WO-96/29397 A1 | 9/1996 |
| WO | WO-97/04079 A1 | 2/1997 |
| WO | WO-97/07202 A1 | 2/1997 |
| WO | WO-97/43424 A1 | 11/1997 |
| WO | WO-98/08940 A1 | 3/1998 |
| WO | WO-98/12307 A1 | 3/1998 |
| WO | WO-98/20115 A1 | 5/1998 |
| WO | WO-98/20116 A1 | 5/1998 |
| WO | WO-98/34946 A1 | 8/1998 |
| WO | WO-99/001544 A1 | 1/1999 |
| WO | WO-00/27367 A1 | 5/2000 |
| WO | WO-00/060063 A1 | 10/2000 |
| WO | WO-02/090486 A1 | 11/2002 |
| WO | WO-03/041667 A2 | 5/2003 |
| WO | WO-2004/108917 A1 | 12/2004 |
| WO | WO-2007/087508 A2 | 8/2007 |
| WO | WO-2008/114171 A1 | 9/2008 |
| WO | WO-2009/109500 A1 | 9/2009 |
| WO | WO-2009/152031 A1 | 12/2009 |
| WO | WO-2011/026171 A1 | 3/2011 |
| WO | WO-2011/163428 A1 | 12/2011 |

OTHER PUBLICATIONS

Dartois et al., Cloning, nucleotide sequence and expression in *Escherichia coli* of a lipase gene from Bacillus subtilis 168, Biochim. Biophys. Acta, 1131(3):253-60 (1992).

International Preliminary Report on Patentability and Written Opinion for Applcation No. PCT/US2013/034986, dated Oct. 21, 2014.

International Search Report and Written Opinion for Application No. PCT/US2013/034986, dated Jul. 9, 2013.

Poucher (ed.), Perfumes Cosmetics and Soaps, 2nd ed. (1959).

Zhang et al., Microencapsulation technology and application thereof in detergent, Surfactant Soap and Detergent, Issue 6, pp. 56-58 (2009).

Office Action (English translation), Taiwan Patent Application No. 102113521, dated Nov. 25, 2016.

Official Action (with English translation), Japanese patent application No. 2015-507029, dated Jan. 4, 2017.

Australian Patent Application No. 2017202549, Examination Report No. 1, dated Dec. 21, 2017.

Japanese Patent Application No. 2015-507029, Office Action (English Translation), dated Nov. 20, 2017.

Office Action for U.S. Appl. No. 15/858,644, dated Apr. 5, 2018.

* cited by examiner

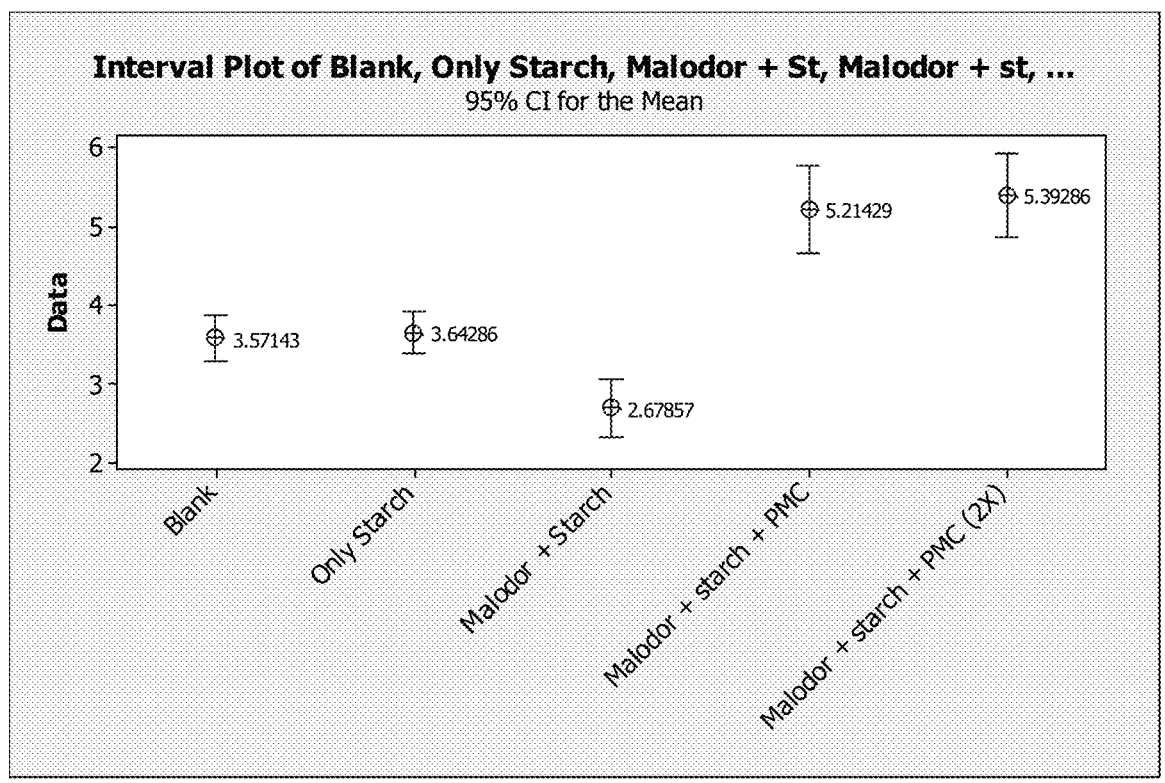
Plot of odor perceived by sensory panel vs. pouch type.

POWDERED POUCH AND METHOD OF MAKING SAME

CROSS REFERENCE TO RELATED APPLICATION

This is a continuation of U.S. patent application Ser. No. 15/858,644, filed Dec. 29, 2017, which is a continuation of U.S. patent application Ser. No. 15/214,197, filed Jul. 19, 2016, which is a continuation of U.S. patent application Ser. No. 13/828,299, filed Mar. 14, 2013, which claims the benefit under 35 U.S.C. § 119(e) of U.S. Provisional Patent Application No. 61/624,926, filed Apr. 16, 2012. The entire disclosures of the foregoing applications are incorporated herein by reference.

FIELD OF THE INVENTION

The present disclosure relates generally to water-soluble films and related packets. More particularly the disclosure relates to water soluble films and packets comprised of water-soluble films coated by a powder that includes an active agent.

BACKGROUND

Water-soluble packets are known in the art. These compositions have the advantage that they are easy to dose, handle, transport and store.

The film material used in water-soluble packets is often relatively fragile since in most applications it must release the product quickly and completely in water, and without leaving residue. To achieve this, the film material must be thin and must have a high water-reactivity.

The incorporation of powder into film material is known in the art. A polyvinyl alcohol-type film can be obtained by distributing an aqueous dispersion of a fine powder on one or both sides and then drying the film, for example for good slip properties and adhesion resistance.

In addition, powdering of film material is known. A dusting treatment agent for imparting inter-film lubricity to a film of thermoplastic resin has been described. In packets containing liquid compositions, powdering has been used to reduce the negative effects of weeping, such as a tacky feel or premature loss of product. Additionally, the water-soluble nature of such packets often renders them vulnerable to humidity, which can weaken the structural integrity of the film. Exposure to humid conditions often results in the packets sticking together and packet failure upon separation.

SUMMARY

One aspect of the disclosure is a water-soluble packet comprising a water-soluble film in the form of a packet and coated by a powder, wherein the powder comprises a mixture of a powdered lubricant and an active agent, wherein the active agent is not a fragrance. Optionally, the active agent may be encapsulated.

Another aspect of the disclosure is a water-soluble packet comprising a water-soluble film in the form of a packet and coated by a powder, wherein the powder comprises a mixture of a powdered lubricant and an active agent which comprises a microencapsulated fragrance.

Still another aspect of the disclosure is a method of providing a water-soluble film and/or film packet additional functionality, including the steps of coating a water-soluble film and/or film packet with a powder comprising an active agent. The water soluble packet and powder are made according to the disclosure herein. Optionally, the active agent can be encapsulated.

While the disclosure of preferred embodiments herein provides descriptions of film packets, the powdered film itself, prior to formation into a packet is also contemplated, such that for any embodiment describing a packet, a film is equally contemplated. Thus, another aspect of the disclosure is a water-soluble film coated by a powder, wherein the powder comprises a mixture of a powdered lubricant and an active agent, wherein the active agent is not a fragrance. Optionally, the active agent may be encapsulated. Another aspect of the disclosure is a water-soluble film coated by a powder, wherein the powder comprises a mixture of a powdered lubricant and an active agent which comprises a microencapsulated fragrance.

Further aspects and advantages will be apparent to those of ordinary skill in the art from a review of the following detailed description. While the compositions and methods are susceptible of embodiments in various forms, the description hereafter includes specific embodiments with the understanding that the disclosure is illustrative, and is not intended to limit the invention to the specific embodiments described herein.

BRIEF DESCRIPTION OF THE DRAWINGS

FIG. 1 shows an interval plot of the numerical value (and 95% confidence interval) of the odor perceived from each pouch type tested according to the Example described below.

DETAILED DESCRIPTION

Disclosed herein are water-soluble films and packets comprising a water-soluble film in the form of a packet and coated by a powder, wherein the powder comprises a mixture of a powdered lubricant and an active agent. Optionally, the active agent is microencapsulated. In one type of embodiment, the active agent comprises a microencapsulated fragrance. In embodiments, the microcapsule provides for a controlled release of the active agent through mechanisms including, but not limited to, mechanical rupture, melt, ablation, dissolution, diffusion, biodegradation, or pH-controlled release.

One type of embodiment of the water-soluble packets will comprise, enclosed within the packet, solid, liquid or gel compositions, or combinations thereof. Non-limiting examples of the enclosed composition include laundry detergents, bleach and laundry additives, fabric care, dishwashing, hard surface cleaning, beauty care, skin care, other personal care, or food product compositions.

The disclosure further provides a method of providing additional functionality to a water-soluble packet through the powder coating. The powder coating is comprised of a powder lubricant and an active agent. This combination has been demonstrated to be particularly advantageous in providing the packet with additional functionality while improving the feel of the packet surface, mitigating potential weeping of liquid products onto surface of the packet, and preventing the packets from sticking together, thereby preventing possible failure during separation. The water-soluble packets of the disclosure herein can have one or more other, optional advantages including, delivering an active agent to a substrate before the water-soluble packet is dissolved, providing a controlled and delayed release of the active agent, providing an accurate dosing of active agent and enabling the packet to comprise more than one active agent per packet. In particular, water-soluble packets according to one class of embodiments of the disclosure can demonstrate advantageous stability if one or more of the active agents is known to be unstable in the presence of another active agent or in the presence of a component of the composition enclosed within the packet. Additionally, the method of providing the packet additional functionality through the incorporation of the active agent into the powder coating is advantageous because no new processing equipment is needed to produce the packet.

Ranges may be expressed herein as from "about" or "approximately" one particular value and/or to "about" or "approximately" another particular value. When such a range is expressed, another contemplated embodiment includes from the one particular value and/or to the other particular value. Similarly, when particular values are expressed as approximations, but use antecedents such as "about," "at least," or "less than about," it will be understood that the particular value forms another embodiment.

As used herein, the term "comprising" indicates the potential inclusion of other agents, elements, steps, or features, in addition to those specified.

As used herein and unless specified otherwise all measurements of viscosity in centipoises (cP) are of a 4% solution at 20° C.

As used herein and unless specified otherwise, the terms "wt. %" and "wt %" are intended to refer to the composition of the identified element in "dry" (non water) parts by weight of the entire film (when applicable) or parts by weight of the entire composition enclosed within a packet (when applicable). As used herein and unless specified otherwise, the term "phr" is intended to refer to the composition of the identified element in parts per one hundred parts water-soluble polymer resin.

As used herein, the term "coating powder" refers to the mixture of powdered lubricant and active agent. Optionally the active agent may be microencapsulated.

The packet includes a water-soluble film as at least one wall of the packet, and optionally the water-soluble film is the sole film component of the packet. Water-soluble films of this type which can be made into packets, optional ingredients for use therein, and methods of making the same are well known in the art.

In one class of embodiments, the water-soluble film includes PVOH. PVOH is a synthetic resin generally prepared by the alcoholysis, usually termed hydrolysis or saponification, of polyvinyl acetate. Fully hydrolyzed PVOH, wherein virtually all the acetate groups have been converted to alcohol groups, is a strongly hydrogen-bonded, highly crystalline polymer which dissolves only in hot water—greater than about 140° F. (60° C.). If a sufficient number of acetate groups are allowed to remain after the hydrolysis of polyvinyl acetate, the PVOH polymer then being known as partially hydrolyzed, it is more weakly hydrogen-bonded and less crystalline and is soluble in cold water—less than about 50° F. (10° C.). An intermediate cold/hot water soluble film can include, for example, intermediate partially-hydrolyzed PVOH (e.g., with degrees of hydrolysis of about 94% to about 98%), and is readily soluble only in warm water—e.g., rapid dissolution at temperatures of about 40° C. and greater. Both fully and partially hydrolyzed PVOH types are commonly referred to as PVOH homopolymers although the partially hydrolyzed type is technically a vinyl alcohol-vinyl acetate copolymer.

The degree of hydrolysis of the PVOH included in the water-soluble films of the present disclosure can be about 75% to about 99%, for example. As the degree of hydrolysis is reduced, a film made from the resin will have reduced mechanical strength but faster solubility at temperatures below about 20° C. As the degree of hydrolysis increases, a film made from the resin will tend to be mechanically stronger and the thermoformability will tend to decrease. The degree of hydrolysis of the PVOH can be chosen such that the water-solubility of the resin is temperature dependent, and thus the solubility of a film made from the resin, and additional ingredients is also influenced. In one class of embodiments the film is cold water-soluble. A cold water-soluble film, soluble in water at a temperature of less than 10° C., can include PVOH with a degree of hydrolysis in a range of about 75% to about 90%, or in a range of about 80% to about 90%, or in a range of about 85% to about 90%. In another class of embodiments the film is hot water-soluble. A hot water-soluble film, soluble in water at a temperature of at least about 60° C., can include PVOH with a degree of hydrolysis of at least about 98%.

Other film-forming resins for use in addition to or in an alternative to PVOH can include, but are not limited to, modified polyvinyl alcohols, polyacrylates, water-soluble acrylate copolymers, polyaminopropyl sulfonic acid and salts thereof, polyitaconic acid and salts thereof, polyacrylamides, polyvinyl pyrrolidone, pullulan, cellulosics, including but not limited to carboxymethyl cellulose and hydroxypropyl methyl cellulose, water-soluble natural polymers including, but not limited to, guar gum, xanthan gum, carrageenan, and starch, water-soluble polymer derivatives including, but not limited to, modified starches, including ethoxylated starch and hydroxypropylated starch, poly(sodium acrylamido-2-methylpropane sulfonate), polymonomethylmaleate and salts thereof, copolymers thereof, and combinations of any of the foregoing with each other and/or with PVOH.

The water-soluble resin can be included in the water-soluble film in any suitable amount, for example an amount in a range of about 35 wt % to about 90 wt %. The weight ratio of the amount of the water-soluble resin as compared to the combined amount of additives can be any suitable ratio, for example a ratio in a range of about 0.5 to about 5, or about 1 to 3, or about 1 to 2.

Water-soluble resins for use in the films described herein (including, but not limited to PVOH resins) can be characterized by any suitable viscosity for the desired film properties, optionally a viscosity in a range of about 8.0 to about 40.0 cP, or about 10.0 cP to about 30 cP, or about 13 cP to about 27 cP. The viscosity of a PVOH resin is determined by measuring a freshly made solution using a Brookfield LV type viscometer with UL adapter as described in British Standard EN ISO 15023-2:2006 Annex E Brookfield Test method. It is international practice to state the viscosity of 4% aqueous solution at 20° C. All viscosities specified herein in cP should be understood to refer to the viscosity of 4% aqueous solution at 20° C., unless specified otherwise.

It is well known in the art that the viscosity of a resin is correlated with the weight average molecular weight ($\overline{M}w$) of the same resin, and often the viscosity is used as a proxy for $\overline{M}w$. Thus, the weight average molecular weight of the water-soluble resin optionally can be in a range of about 35,000 to about 205,000, or about 80,000 to about 170,000, or about 97,000 to about 160,000 Daltons. The molecular weight of the resin need only be sufficient to enable it to be molded by suitable techniques to form a thin plastic film.

The water-soluble films according to the present disclosure may include other optional additive ingredients including, but not limited to, plasticizers, surfactants, emulsifiers, fillers, extenders, antiblocking agents, detackifying agents, antifoams, film formers and other functional ingredients, for example in amounts suitable for their intended purpose.

Water is recognized as a very efficient plasticizer for PVOH and other polymers; however, the volatility of water makes its utility limited since polymer films need to have at least some resistance (robustness) to a variety of ambient conditions including low and high relative humidity. Glycerin is much less volatile than water and has been well established as an effective plasticizer for PVOH and other polymers. Glycerin or other such liquid plasticizers by themselves can cause surface "sweating" and greasiness if the level used in the film formulation is too high. This can lead to problems in a film such as unacceptable feel to the hand of the consumer and even blocking of the film on the roll or in stacks of sheets if the sweating is not mitigated in some manner, such as powdering of the surface. This could be characterized as over plasticization. However, if too little plasticizer is added to the film the film may lack sufficient ductility and flexibility for many end uses, for example to be converted into a final use format such as packets.

Plasticizers for use in water-soluble films of the present disclosure include, but are not limited to, sorbitol, glycerol, diglycerol, propylene glycol, ethylene glycol, diethylenegly-col, triethylene glycol, tetraethyleneglycol, polyethylene glycols up to MW 400, 2 methyl 1, 3 propane diol, lactic acid, monoacetin, triacetin, triethyl citrate, 1,3-butanediol, trimethylolpropane (TMP), polyether triol, and combinations thereof. As less plasticizer is used, the film can become more brittle, whereas as more plasticizer is used the film can lose tensile strength. Plasticizers can be included in the water-soluble films in an amount in a range of about 25 phr to about 50 phr, or from about 30 phr to about 45 phr, or from about 32 phr to about 42 phr, for example.

Surfactants for use in water-soluble films are well known in the art. Optionally, surfactants are included to aid in the dispersion of the resin solution upon casting. Suitable surfactants for water-soluble films of the present disclosure include, but are not limited to, dialkyl sulfosuccinates, lactylated fatty acid esters of glycerol and propylene glycol, lactylic esters of fatty acids, sodium alkyl sulfates, polysorbate 20, polysorbate 60, polysorbate 65, polysorbate 80, alkyl polyethylene glycol ethers, lecithin, acetylated fatty acid esters of glycerol and propylene glycol, sodium lauryl sulfate, acetylated esters of fatty acids, myristyl dimethylamine oxide, trimethyl tallow alkyl ammonium chloride, quaternary ammonium compounds, salts thereof and combinations of any of the forgoing. Too little surfactant can sometimes result in a film having holes, whereas too much surfactant can result in the film having a greasy or oily feel from excess surfactant present on the surface of the film. Thus, surfactants can be included in the water-soluble films in an amount of less than about 2 phr, for example less than about 1 phr, or less than about 0.5 phr, for example.

One type of secondary component contemplated for use is a defoamer. Defoamers can aid in coalescing of foam bubbles. Suitable defoamers for use in water-soluble films according to the present disclosure include, but are not limited to, hydrophobic silicas, for example silicon dioxide or fumed silica in fine particle sizes, including Foam Blast® defoamers available from Emerald Performance Materials, including Foam Blast® 327, Foam Blast® UVD, Foam Blast® 163, Foam Blast® 269, Foam Blast® 338, Foam Blast® 290, Foam Blast® 332, Foam Blast® 349, Foam Blast® 550 and Foam Blast® 339, which are proprietary, non-mineral oil defoamers. In embodiments, defoamers can be used in an amount of 0.5 phr, or less, for example, 0.05 phr, 0.04 phr, 0.03 phr, 0.02 phr, or 0.01 phr.

Processes for making water-soluble articles, including films and packets, include casting, blow-molding, extrusion and blown extrusion, as known in the art. One contemplated class of embodiments is characterized by the water-soluble film described herein being formed by casting, for example, by admixing the ingredients described herein with water to create an aqueous mixture, for example a solution with optionally dispersed solids, applying the mixture to a surface, and drying off water to create a film. Similarly, other compositions can be formed by drying the mixture while it is confined in a desired shape.

The film is useful for creating a packet to contain a composition, for example laundry or dishwashing compositions, thereby forming a packet. The film described herein can also be used to make a packet with two or more compartments made of the same film or in combination with films of other polymeric materials. Additional films can, for example, be obtained by casting, blow-molding, extrusion or blown extrusion of the same or a different polymeric material, as known in the art. In one type of embodiment, the polymers, copolymers or derivatives thereof suitable for use as the additional film are selected from polyvinyl alcohols, polyvinyl pyrrolidone, polyalkylene oxides, polyacrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatin, natural gums including, but not limited to, xanthan, and carrageenans. For example, polymers can be selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and combinations thereof, or selected from polyvinyl alcohols, polyvinyl alcohol copolymers and hydroxypropyl methyl cellulose (HPMC), and combinations thereof.

The packets of the present disclosure comprise at least one sealed compartment. Thus the packets may comprise a single compartment or multiple compartments. In embodiments comprising multiple compartments, each compartment may contain identical and/or different compositions. In turn, the compositions may take any suitable form including, but not limited to liquid, solid and combinations thereof (e.g. a solid suspended in a liquid). In some embodiments, the packets comprises a first, second and third compartment, each of which respectively contains a different first, second and third composition. In some embodiments, the compositions may be visually distinct as described in European Patent Application Number 09161692.0 (filed Jun. 2, 2009 and assigned to the Procter & Gamble Company).

The compartments of multi-compartment packets may be of the same or different size(s) and/or volume(s). The compartments of the present multi-compartment packets can be separate or conjoined in any suitable manner. In some embodiments, the second and/or third and/or subsequent compartments are superimposed on the first compartment. In one embodiment, the third compartment may be superimposed on the second compartment, which is in turn superimposed on the first compartment in a sandwich configuration. Alternatively the second and third compartments may be superimposed on the first compartment. However it is also equally envisaged that the first, second and optionally third and subsequent compartments may be attached to one another in a side by side relationship. The compartments may be packed in a string, each compartment being individually separable by a perforation line. Hence each compartment may be individually torn-off from the remainder of the string by the end-user, In some embodiments, multi-compartment packets include three compartments consisting of a large first compartment and two smaller compartments. The second and third smaller compartments are superimposed on the first larger compartment. The size and geometry of the compartments are chosen such that this arrangement is achievable. The geometry of the compartments may be the same or different. In some embodiments the second and optionally third compartment each has a different geometry and shape as compared to the first compartment. In these embodiments, the second and optionally third compartments are arranged in a design on the first compartment. The design may be decorative, educative, or illustrative, for example to illustrate a concept or instruction, and/or used to indicate origin of the product. In some embodiments, the first compartment is the largest compartment having two large faces sealed around the perimeter, and the second compartment is smaller covering less than about 75%, or less than about 50% of the surface area of one face of the first compartment. In embodiments in which there is a third compartment, the aforementioned structure may be the same but the second and third compartments cover less than about 60%, or less than about 50%, or less than about 45% of the surface area of one face of the first compartment.

The packets of the present disclosure may comprise one or more different films. For example, in single compartment embodiments, the packet may be made from one wall that is folded onto itself and sealed at the edges, or alternatively, two walls that are sealed together at the edges. In multiple compartment embodiments, the packet may be made from one or more films such that any given packet compartment may comprise walls made from a single film or multiple films having differing compositions. In one embodiment, a multi-compartment packet comprises at least three walls: an outer upper wall; an outer lower wall; and a partitioning wall. The outer upper wall and the outer lower wall are generally opposing and form the exterior of the packet. The partitioning wall is interior to the packet and is secured to the generally opposing outer walls along a seal line. The partitioning wall separates the interior of the multi-compartment packet into at least a first compartment and a second compartment. In one class of embodiments, the partitioning wall may be the only enzyme containing film thereby minimizing the exposure of the consumer to the enzymes.

Packets may be made using any suitable equipment and method. For example, single compartment packets may be made using vertical form filling, horizontal form filling, or rotary drum filling techniques commonly known in the art. Such processes may be either continuous or intermittent. The film may be dampened, and/or heated to increase the malleability thereof. The method may also involve the use of a vacuum to draw the film into a suitable mold. The vacuum drawing the film into the mold can be applied for about 0.2 to about 5 seconds, or about 0.3 to about 3, or about 0.5 to about 1.5 seconds, once the film is on the horizontal portion of the surface. This vacuum can be such that it provides an under-pressure in a range of 10 mbar to 1000 mbar, or in a range of 100 mbar to 600 mbar, for example.

The molds, in which packets may be made, can have any shape, length, width and depth, depending on the required dimensions of the packets. The molds may also vary in size and shape from one to another, if desirable. For example, the volume of the final packets may be about 5 ml to about 300 ml, or about 10 to 150 ml, or about 20 to about 100 ml, and that the mold sizes are adjusted accordingly.

In one embodiment, the packet includes a first and a second sealed compartment. The second compartment is in a generally superposed relationship with the first sealed compartment such that the second sealed compartment and the first sealed compartment share a partitioning wall interior to the packet.

In one embodiment, the packet including a first and a second compartment further includes a third sealed compartment. The third sealed compartment is in a generally superposed relationship with the first sealed compartment such that the third sealed compartment and the first sealed compartment share a partitioning wall interior to the packet.

In various embodiments, the first composition and the second composition are selected from one of the following combinations: liquid, liquid; liquid, powder; powder, powder; and powder, liquid.

In various embodiments, the first, second and third compositions are selected from one of the following combinations: solid, liquid, liquid and liquid, liquid, liquid.

In one embodiment, the single compartment or plurality of sealed compartments contains a composition. The plurality of compartments may each contain the same or a different composition. The composition is selected from a liquid, solid or combination thereof.

Heat can be applied to the film in the process commonly known as thermoforming. The heat may be applied using any suitable means. For example, the film may be heated directly by passing it under a heating element or through hot air, prior to feeding it onto a surface or once on a surface. Alternatively, it may be heated indirectly, for example by heating the surface or applying a hot item onto the film. The film can be heated using an infrared light. The film may be heated to a temperature of at least 50° C., for example about 50 to about 150° C., about 50 to about 120° C., about 60 to about 130° C., about 70 to about 120° C., or about 60 to about 90° C.

Alternatively, the film can be wetted by any suitable means, for example directly by spraying a wetting agent (including water, a solution of the film composition, a plasticizer for the film composition, or any combination of the foregoing) onto the film, prior to feeding it onto the surface or once on the surface, or indirectly by wetting the surface or by applying a wet item onto the film.

Once a film has been heated and/or wetted, it may be drawn into an appropriate mold, preferably using a vacuum. The film can be thermoformed with a draw ratio of at least about 1.5, for example, and optionally up to a draw ratio of 2, for example. The filling of the molded film can be accomplished by utilizing any suitable means. In some embodiments, the most preferred method will depend on the product form and required speed of filling. In some embodiments, the molded film is filled by in-line filling techniques. The filled, open packets are then closed forming the packets, using a second film, by any suitable method. This may be accomplished while in horizontal position and in continuous, constant motion. The closing may be accomplished by continuously feeding a second film, for example, a water-soluble film, over and onto the open packets and then sealing the first and second film together, typically in the area between the molds and thus between the packets.

Any suitable method of sealing the packet and/or the individual compartments thereof may be utilized. Non-limiting examples of such means include heat sealing, solvent welding, solvent or wet sealing, and combinations thereof. The water-soluble packet and/or the individual compartments thereof can be heat sealed at a temperature of at least 200° F. (93° C.), for example in a range of about 220° F. (about 105° C.) to about 290° F. (about 145° C.), or about 230° F. (about 110° C.) to about 280° F. (about 140° C.). Typically, only the area which is to form the seal is treated with heat or solvent. The heat or solvent can be applied by any method, typically on the closing material, and typically only on the areas which are to form the seal. If solvent or wet sealing or welding is used, heat may optionally also be applied. Suitable wet or solvent sealing/welding methods include selectively applying solvent onto the area between the molds, or on the closing material, by for example, spraying or printing this onto these areas, and then applying pressure onto these areas, to form the seal. Sealing rolls and belts as described above (optionally also providing heat) can be used, for example.

The formed packets may then be cut by a cutting device. Cutting can be accomplished using any known method. It may be preferred that the cutting is also done in continuous manner, and preferably with constant speed and preferably while in horizontal position. The cutting device can, for example, be a sharp item, or a hot item, or a laser, whereby in the latter cases, the hot item or laser 'burns' through the film/sealing area.

The different compartments of a multi-compartment packets may be made together in a side-by-side style wherein the resulting, cojoined packets may or may not be separated by cutting. Alternatively, the compartments can be made separately.

In some embodiments, packets may be made according to a process including the steps of:
a) forming a first compartment (as described above);
b) forming a recess within some or all of the closed compartment formed in step (a), to generate a second molded compartment superposed above the first compartment;
c) filling and closing the second compartments by means of a third film;
d) sealing the first, second and third films; and
e) cutting the films to produce a multi-compartment packet.

The recess formed in step (b) may be achieved by applying a vacuum to the compartment prepared in step (a).

In some embodiments, second, and/or third compartment(s) can be made in a separate step and then combined with the first compartment as described in European Patent Application Number 08101442.5 or WO 2009/152031 (filed Jun. 13, 2008 and assigned to the Procter & Gamble Company).

In other embodiments, packets may be made according to a process including the steps of:
a) forming a first compartment, optionally using heat and/or vacuum, using a first film on a first forming machine;
b) filling the first compartment with a first composition;
c) on a second forming machine, deforming a second film, optionally using heat and vacuum, to make a second and optionally third molded compartment;
d) filling the second and optionally third compartments;
e) sealing the second and optionally third compartment using a third film;
f) placing the sealed second and optionally third compartments onto the first compartment;
g) sealing the first, second and optionally third compartments; and
h) cutting the films to produce a multi-compartment packet.

The first and second forming machines may be selected based on their suitability to perform the above process. In some embodiments, the first forming machine can be a horizontal forming machine, and the second forming machine can be a rotary drum forming machine, optionally located above the first forming machine.

It should be understood that by the use of appropriate feed stations, it may be possible to manufacture multi-compartment packets incorporating a number of different or distinctive compositions and/or different or distinctive liquid, gel or paste compositions.

The water-soluble film and/or packet described herein must be at least partially coated with a powder composition. The powder can be present on the packet in an amount of at least about 0.01 mg/cm$^2$, or in a range of about 0.01 mg/cm$^2$ to about 10 mg/cm$^2$, for example. The outer surface of the film packet can be coated. In some embodiments, the inner surface of the film packet can be coated, in the alternative to or in addition to the outer film surface. In one embodiment, the powder composition is applied to the film after forming a packet. In another embodiment, the powder composition is applied to the film before forming a packet.

The powdered lubricant is a powder that when present as the only powder component aids in preventing the packets from sticking together during conditions which can be present during film conversion, or when packets are in close proximity, such as in secondary packaging, preventing possible failure during separation, optionally one or more of the following: temperature about 10° C. to about 40° C., or about 15° C. to about 35° C., or about 20° C. to about 25° C.; relative humidity from about 10% to about 50%, or about 15% to about 45%, or about 20% to about 40%, or +/−5% relative humidity of the equilibrium percent relative humidity (eRH) of the film as received in its package. Additionally, in one class of embodiments the powdered lubricant can mitigate potential weeping of liquid contents and thereby improve the feel of the packet surface. When present in the coating powder composition in an amount of at least about 1 wt %, for example, the powdered lubricant additionally acts as a carrier for active agent and aids in uniformly dispersing the active agent. In some embodiments, the powdered lubricant aids in the mechanical rupture of the microcapsules that contain active agents.

In one type of embodiment, the powdered lubricant has an average particle size of at least about 0.1 μm, or in a range of about 0.1 μm to about 100 μm, for example. Typically, a powder such as starch could be used, such a powder being well known. Other suitable materials include modified starches (including, but not limited to, corn starch, potato starch, or hydroxyl ethyl starch), silicas, siloxanes, calcium carbonate, magnesium carbonate, clay, talc, silicic acid, kaolin, gypsum, zeolites, cylclodextrins, calcium stearate, zinc stearate, alumina, magnesium stearate, alumina, zinc oxide and combinations of any of the foregoing. Generally, the powder will be inert. The powder lubricant is present in the coating powder in an amount of at least about 1 wt %, or in a range of about 1 wt % to about 99 wt %.

The active agent, when present in the coating powder composition in an amount of at least about 1 wt %, or in a range of about 1 wt % to about 99 wt %, provides additional functionality to the packet. In embodiments, the active agent can comprise one or more components including, but not limited to, enzymes, oils, flavors, colorants, odor absorbers, fragrances, pesticides, fertilizers, activators, acid catalysts, metal catalysts, ion scavengers, bleaches, bleach components, fabric softeners or combinations thereof. The active agent can take any desired form, including as a solid, a liquid, a mull, a paste, a gas, etc., and optionally can be encapsulated.

In certain embodiments, the active agent may comprise an enzyme. Suitable enzymes include enzymes categorized in any one of the six conventional Enzyme Commission (EC) categories, i.e., the oxidoreductases of EC 1 (which catalyze oxidation/reduction reactions), the transferases of EC 2 (which transfer a functional group, e.g., a methyl or phosphate group), the hydrolases of EC 3 (which catalyze the hydrolysis of various bonds), the lyases of EC 4 (which cleave various bonds by means other than hydrolysis and oxidation), the isomerases of EC 5 (which catalyze isomerization changes within a molecule) and the ligases of EC 6 (which join two molecules with covalent bonds). Examples of such enzymes include dehydrogenases and oxidases in EC 1, transaminases and kinases in EC 2, lipases, cellulases, amylases, mannanases, and peptidases (a.k.a. proteases or proteolytic enzymes) in EC 3, decarboxylases in EC 4, isomerases and mutases in EC 5 and synthetases and synthases of EC 6.

Oxidoreductases

Oxidoreductases include, but are not limited to: those acting on the CH—OH group of donors; those acting on the aldehyde or oxo group of donors; those acting on the CH—CH group of donors; those acting on the CH—$NH_2$ group of donors; those acting on the CH—NH group of donors; those acting on NADH or NADPH; those acting on other nitrogenous compounds as donors; those acting on a sulfur group of donors; those acting on a heme group of donors; those acting on diphenols and related substances as donors; those acting on a peroxide as acceptor; those acting on hydrogen as donor; those acting on single donors with incorporation of molecular oxygen (oxygenases); those acting on paired donors, with incorporation or reduction of molecular oxygen; those acting on superoxide radicals as acceptor; those oxidizing metal ions; those acting on CH or $CH_2$ groups; those acting on iron-sulfur proteins as donors; those acting on reduced flavodoxin as donor; those acting on phosphorus or arsenic in donors; those acting on X—H and Y—H to form an X—Y bond; and those acting on halogen in donors.

The oxidoreductases which act on the CH—OH group of donors can include, but are not limited to, those with NAD+ or NADP+ as acceptor (including alcohol dehydrogenase, alcohol dehydrogenase ($NADP^+$), homoserine dehydrogenase, (R,R)-butanediol dehydrogenase, glycerol dehydrogenase, propanediol-phosphate dehydrogenase, glycerol-3-phosphate dehydrogenase ($NAD^+$), D-xylulose reductase, L-xylulose reductase, D-arabinitol 4-dehydrogenase, L-arabinitol 4-dehydrogenase, L-arabinitol 2-dehydrogenase, L-iditol 2-dehydrogenase, D-iditol 2-dehydrogenase, galactitol 2-dehydrogenase, mannitol-1-phosphate 5-dehydrogenase, inositol 2-dehydrogenase, glucuronate reductase, glucuronolactone reductase, aldehyde reductase, UDP-glucose 6-dehydrogenase, histidinol dehydrogenase, quinate dehydrogenase, shikimate dehydrogenase, glyoxylate reductase, L-lactate dehydrogenase, D-lactate dehydrogenase, glycerate dehydrogenase, 3-hydroxybutyrate dehydrogenase, 3-hydroxyisobutyrate dehydrogenase, mevaldate reductase, mevaldate reductase (NADPH), hydroxymethylglutaryl-CoA reductase (NADPH), 3-hydroxyacyl-CoA dehydrogenase, acetoacetyl-CoA reductase, malate dehydrogenase, malate dehydrogenase (oxaloacetate-decarboxylating), malate dehydrogenase (decarboxylating), malate dehydrogenase (oxaloacetate-decarboxylating) ($NADP^+$), isocitrate dehydrogenase ($NAD^+$), isocitrate dehydrogenase ($NADP^+$), phosphogluconate 2-dehydrogenase, phosphogluconate dehydrogenase (decarboxylating), L-gulonate 3-dehydrogenase, L-arabinose 1-dehydrogenase, glucose 1-dehydrogenase, galactose 1-dehydrogenase, glucose-6-phosphate dehydrogenase, 3α-hydroxysteroid dehydrogenase (B-specific), 3 (or 17)β-hydroxysteroid dehydrogenase, 3α-hydroxycholanate dehydrogenase, 3α(or 20β)-hydroxysteroid dehydrogenase, allyl-alcohol dehydrogenase, lactaldehyde reductase (NADPH), ribitol 2-dehydrogenase, fructuronate reductase, tagaturonate reductase, 3-hydroxypropionate dehydrogenase, 2-hydroxy-3-oxopropionate reductase, 4-hydroxybutyrate dehydrogenase, estradiol 17β-dehydrogenase, testosterone 17β-dehydrogenase, testosterone 17β-dehydrogenase ($NADP^+$), pyridoxine 4-dehydrogenase, w-hydroxydecanoate dehydrogenase, mannitol 2-dehydrogenase, gluconate 5-dehydrogenase, alcohol dehydrogenase [$NAD(P)^+$], glycerol dehydrogenase ($NADP^+$), octanol dehydrogenase, (R)-aminopropanal dehydrogenase, (S,S)-butanediol dehydrogenase, lactaldehyde reductase, methylglyoxal reductase (NADH-dependent), glyoxylate reductase ($NADP^+$), isopropanol dehydrogenase ($NADP^+$), hydroxypyruvate reductase, malate dehydrogenase ($NADP^+$), D-malate dehydrogenase (decarboxylating), dimethylmalate dehydrogenase, 3-isopropylmalate dehydrogenase, ketol-acid reductoisomerase, homoisocitrate dehydrogenase, hydroxymethylglutaryl-CoA reductase, aryl-alcohol dehydrogenase, aryl-alcohol dehydrogenase ($NADP^+$), oxaloglycolate reductase (decarboxylating), tartrate dehydrogenase, glycerol-3-phosphate dehydrogenase [$NAD(P)^+$], phosphoglycerate dehydrogenase, diiodophenylpyruvate reductase, 3-hydroxybenzyl-alcohol dehydrogenase, (R)-2-hydroxy-fatty-acid dehydrogenase, (S)-2-hydroxy-fatty-acid dehydrogenase, 3-oxoacyl-[acyl-carrier-protein] reductase, acylglycerone-phosphate reductase, 3-dehydrosphinganine reductase, L-threonine 3-dehydrogenase, 4-oxoproline reductase, all-trans-retinol dehydrogenase ($NAD^+$), pantoate 4-dehydrogenase, pyridoxal 4-dehydrogenase, carnitine 3-dehydrogenase, indolelactate dehydrogenase, 3-(imidazol-5-yl)lactate dehydrogenase, indanol dehydrogenase, L-xylose 1-dehydrogenase, apiose 1-reductase, ribose 1-dehydrogenase ($NADP^+$), D-arabinose 1-dehydrogenase, D-arabinose 1-dehydrogenase [$NAD(P)^+$], glucose 1-dehydrogenase ($NAD^+$), glucose 1-dehydrogenase ($NADP^+$), galactose 1-dehydrogenase ($NADP^+$), aldose 1-dehydrogenase, D-threo-aldose 1-dehydrogenase, sorbose 5-dehydrogenase ($NADP^+$), fructose 5-dehydrogenase ($NADP^+$), 2-deoxy-D-gluconate 3-dehydrogenase, 2-dehydro-3-deoxy-D-gluconate 6-dehydrogenase, 2-dehydro-3-deoxy-D-gluconate 5-dehydrogenase, L-idonate 2-dehydrogenase, L-threonate 3-dehydrogenase, 3-dehydro-L-gulonate 2-dehydrogenase, mannuronate reductase, GDP-mannose 6-dehydrogenase, dTDP-4-dehydrorhamnose reductase, dTDP-6-deoxy-L-talose 4-dehydrogenase, GDP-6-deoxy-D-talose 4-dehydrogenase, UDP-N-acetylglucosamine 6-dehydrogenase, ribitol-5-phosphate 2-dehydrogenase, mannitol 2-dehydrogenase ($NADP^+$), sorbitol-6-phosphate 2-dehydrogenase, 15-hydroxyprostaglandin dehydrogenase ($NAD^+$), D-pinitol dehydrogenase, sequoyitol dehydrogenase, perillyl-alcohol dehydrogenase, 3β-hydroxy-$\Delta^5$-steroid dehydrogenase, 11β-hydroxysteroid dehydrogenase, 16α-hydroxysteroid dehydrogenase, estradiol 17α-dehydrogenase, 20α-hydroxysteroid dehydrogenase, 21-hydroxysteroid dehydrogenase ($NAD^+$), 21-hydroxysteroid dehydrogenase ($NADP^+$), 3α-hydroxy-5β-androstane-17-one 3α-dehydrogenase, sepiapterin reductase, ureidoglycolate dehydrogenase, glycerol 2-dehydrogenase ($NADP^+$), 3-hydroxybutyryl-CoA dehydrogenase, UDP-N- acetylmuramate dehydrogenase, 7α-hydroxysteroid dehydrogenase, dihydrobunolol dehydrogenase, cholestanetetraol 26-dehydrogenase, erythrulose reductase, cyclopentanol dehydrogenase, hexadecanol dehydrogenase, 2-alkyn-1-ol dehydrogenase, hydroxycyclohexanecarboxylate dehydrogenase, hydroxymalonate dehydrogenase, 2-dehydropantolactone reductase (A-specific), 2-dehydropantoate 2-reductase, 3β-hydroxy-4α-methylcholestenecarboxylate 3-dehydrogenase (decarboxylating), 2-oxoadipate reductase, L-rhamnose 1-dehydrogenase, cyclohexane-1,2-diol dehydrogenase, D-xylose 1-dehydrogenase, 12α-hydroxysteroid dehydrogenase, glycerol-3-phosphate 1-dehydrogenase (NADP$^+$), 3-hydroxy-2-methylbutyryl-CoA dehydrogenase, D-xylose 1-dehydrogenase (NADP$^+$), cholest-5-ene-3β,7α-diol 3β-dehydrogenase, geraniol dehydrogenase, carbonyl reductase (NADPH), L-glycol dehydrogenase, dTDP-galactose 6-dehydrogenase, GDP-4-dehydro-D-rhamnose reductase, prostaglandin-F synthase, prostaglandin-E$_2$ 9-reductase, indole-3-acetaldehyde reductase (NADH), indole-3-acetaldehyde reductase (NADPH), long-chain-alcohol dehydrogenase, 5-amino-6-(5-phosphoribosylamino)uracil reductase, coniferyl-alcohol dehydrogenase, cinnamyl-alcohol dehydrogenase, 15-hydroxyprostaglandin-D dehydrogenase (NADP$^+$), 15-hydroxyprostaglandin dehydrogenase (NADP$^+$), (+)-borneol dehydrogenase, (S)-usnate reductase, aldose-6-phosphate reductase (NADPH), 7β-hydroxysteroid dehydrogenase (NADP$^+$), 1,3-propanediol dehydrogenase, uronate dehydrogenase, IMP dehydrogenase, tropinone reductase I, (−)-menthol dehydrogenase, (+)-neomenthol dehydrogenase, 3 (or 17)α-hydroxysteroid dehydrogenase, 3β(or 20α)-hydroxysteroid dehydrogenase, long-chain-3-hydroxyacyl-CoA dehydrogenase, 3-oxoacyl-[acyl-carrier-protein] reductase (NADH), 3α-hydroxysteroid dehydrogenase (A-specific), 2-dehydropantolactone reductase (B-specific), gluconate 2-dehydrogenase, farnesol dehydrogenase, benzyl-2-methyl-hydroxybutyrate dehydrogenase, morphine 6-dehydrogenase, dihydrokaempferol 4-reductase, 6-pyruvoyltetrahydropterin 2'-reductase, vomifoliol 4'-dehydrogenase, (R)-4-hydroxyphenyllactate dehydrogenase, isopiperitenol dehydrogenase, mannose-6-phosphate 6-reductase, chlordecone reductase, 4-hydroxycyclohexanecarboxylate dehydrogenase, (−)-borneol dehydrogenase, (+)-sabinol dehydrogenase, diethyl 2-methyl-3-oxosuccinate reductase, 3α-hydroxyglycyrrhetinate dehydrogenase, 15-hydroxyprostaglandin-I dehydrogenase (NADP$^+$), 15-hydroxyicosatetraenoate dehydrogenase, N-acylmannosamine 1-dehydrogenase, flavanone 4-reductase, 8-oxocoformycin reductase, tropinone reductase II, hydroxyphenylpyruvate reductase, 12β-hydroxysteroid dehydrogenase, 3α(17β)-hydroxysteroid dehydrogenase (NAD$^+$), N-acetylhexosamine 1-dehydrogenase, 6-endo-hydroxycineole dehydrogenase, carveol dehydrogenase, methanol dehydrogenase, cyclohexanol dehydrogenase, pterocarpin synthase, codeinone reductase (NADPH), salutaridine reductase (NADPH), D-arabinitol 2-dehydrogenase, galactitol-1-phosphate 5-dehydrogenase, tetrahydroxynaphthalene reductase, (S)-carnitine 3-dehydrogenase, mannitol dehydrogenase, fluoren-9-ol dehydrogenase, 4-(hydroxymethyl)benzenesulfonate dehydrogenase, 6-hydroxyhexanoate dehydrogenase, 3-hydroxypimeloyl-CoA dehydrogenase, sulcatone reductase, sn-glycerol-1-phosphate dehydrogenase, 4-hydroxythreonine-4-phosphate dehydrogenase, 1,5-anhydro-D-fructose reductase, L-idonate 5-dehydrogenase, 3-methylbutanal reductase, dTDP-4-dehydro-6-deoxyglucose reductase, 1-deoxy-D-xylulose-5-phosphate reductoisomerase, 2-(R)-hydroxypropyl-CoM dehydrogenase, 2-(S)-hydroxypropyl-CoM dehydrogenase, 3-keto-steroid reductase, GDP-L-fucose synthase, (R)-2-hydroxyacid dehydrogenase, vellosimine dehydrogenase, 2,5-didehydrogluconate reductase, (+)-trans-carveol dehydrogenase, serine 3-dehydrogenase, 3β-hydroxy-5β-steroid dehydrogenase, 3β-hydroxy-5α-steroid dehydrogenase, (R)-3-hydroxyacid ester dehydrogenase, (S)-3-hydroxyacid ester dehydrogenase, GDP-4-dehydro-6-deoxy-D-mannose reductase, quinate/shikimate dehydrogenase, methylglyoxal reductase (NADPH-dependent), S-(hydroxymethyl)glutathione dehydrogenase, 3"-deamino-3"-oxonicotianamine reductase, isocitrate-homoisocitrate dehydrogenase, D-arabinitol dehydrogenase (NADP$^+$), xanthoxin dehydrogenase, sorbose reductase, 4-phosphoerythronate dehydrogenase, 2-hydroxymethylglutarate dehydrogenase, 1,5-anhydro-D-fructose reductase (1,5-anhydro-D-mannitol-forming), chlorophyll(ide) b reductase, momilactone-A synthase, dihydrocarveol dehydrogenase, limonene-1,2-diol dehydrogenase, 3-hydroxypropionate dehydrogenase (NADP$^+$), malate dehydrogenase [NAD(P)$^+$], NADP-retinol dehydrogenase, D-arabitol-phosphate dehydrogenase, 2,5-diamino-6-(ribosylamino)-4(3H)-pyrimidinone 5'-phosphate reductase, diacetyl reductase [(R)-acetoin forming], diacetyl reductase [(S)-acetoin forming], UDP-glucuronic acid dehydrogenase (UDP-4-keto-hexauronic acid decarboxylating), S-(hydroxymethyl)mycothiol dehydrogenase, D-xylose reductase, phosphonoacetaldehyde reductase (NADH), sulfopropanediol 3-dehydrogenase, (S)-sulfolactate dehydrogenase, (S)-1-phenylethanol dehydrogenase, 2-hydroxy-4-carboxymuconate semialdehyde hemiacetal dehydrogenase, sulfoacetaldehyde reductase, germacrene A alcohol dehydrogenase, and 11-cis-retinol dehydrogenase); or with a cytochrome as acceptor (including mannitol dehydrogenase (cytochrome), L-lactate dehydrogenase (cytochrome), D-lactate dehydrogenase (cytochrome), D-lactate dehydrogenase (cytochrome c-553), polyvinyl alcohol dehydrogenase (cytochrome), methanol dehydrogenase (cytochrome c), and alcohol dehydrogenase (cytochrome c)); or with oxygen as acceptor (including malate oxidase, glucose oxidase, hexose oxidase, cholesterol oxidase, aryl-alcohol oxidase, L-gulonolactone oxidase, galactose oxidase, pyranose oxidase, L-sorbose oxidase, pyridoxine 4-oxidase, alcohol oxidase, catechol oxidase (dimerizing), (S)-2-hydroxy-acid oxidase, ecdysone oxidase, choline oxidase, secondary-alcohol oxidase, 4-hydroxymandelate oxidase, long-chain-alcohol oxidase, glycerol-3-phosphate oxidase, thiamin oxidase, hydroxyphytanate oxidase, nucleoside oxidase, N-acylhexosamine oxidase, polyvinyl-alcohol oxidase, D-arabinono-1,4-lactone oxidase, vanillyl-alcohol oxidase, nucleoside oxidase (H$_2$O$_2$-forming), and D-mannitol oxidase, alditol oxidase); or with a disulfide as acceptor (including vitamin-K-epoxide reductase (warfarin-sensitive) or vitamin-K-epoxide reductase (warfarin-insensitive)); or with a quinone or similar compound as acceptor (including quinoprotein glucose dehydrogenase, glycerol-3-phosphate dehydrogenase, malate dehydrogenase (quinone), alcohol dehydrogenase (quinone), formate dehydrogenase-N, cyclic alcohol dehydrogenase (quinone), and quinate dehydrogenase (quinine)); or with other, known, acceptors (including alcohol dehydrogenase (azurin) and glucose-6-phosphate dehydrogenase (coenzyme-F$_{420}$)); or with other acceptors (including choline dehydrogenase, 2-hydroxyglutarate dehydrogenase, gluconate 2-dehydrogenase (acceptor), dehydrogluconate dehydrogenase, D-2-hydroxy-acid dehydrogenase, lactate-malate transhydrogenase, pyridoxine 5-dehydrogenase, glucose dehydrogenase (acceptor), fructose 5-dehydrogenase, sorbose dehydrogenase, glucoside 3-dehydrogenase, glycolate dehydrogenase, cellobiose dehydrogenase (acceptor), alkan-1-ol dehydrogenase (acceptor), D-sorbitol dehydrogenase (acceptor), glycerol dehydrogenase (acceptor), hydroxyacid-oxoacid transhydrogenase, 3-hydroxycyclohexanone dehydrogenase, (R)-pantolactone dehydrogenase (flavin), glucose-fructose oxidoreductase, pyranose dehydrogenase (acceptor), 2-oxoacid reductase, (S)-mandelate dehydrogenase, L-sorbose 1-dehydrogenase, formate dehydrogenase (acceptor), soluble quinoprotein glucose dehydrogenase, NDMA-dependent alcohol dehydrogenase, and NDMA-dependent methanol dehydrogenase).

The oxidoreductases which act on the aldehyde or oxo group of donors can include, but are not limited to, those with NAD+ or NADP+ as acceptor (including formate dehydrogenase, aldehyde dehydrogenase (NAD$^+$), aldehyde dehydrogenase (NADP$^+$), aldehyde dehydrogenase [NAD(P)$^+$], benzaldehyde dehydrogenase (NADP$^+$), betaine-aldehyde dehydrogenase, glyceraldehyde-3-phosphate dehydrogenase (NADP$^+$), acetaldehyde dehydrogenase (acetylating), aspartate-semialdehyde dehydrogenase, glyceraldehyde-3-phosphate dehydrogenase (phosphorylating), glyceraldehyde-3-phosphate dehydrogenase (NADP$^+$) (phosphorylating), malonate-semialdehyde dehydrogenase, succinate-semialdehyde dehydrogenase [NAD(P)$^+$], glyoxylate dehydrogenase (acylating), malonate-semialdehyde dehydrogenase (acetylating), aminobutyraldehyde dehydrogenase, glutarate-semialdehyde dehydrogenase, glycolaldehyde dehydrogenase, lactaldehyde dehydrogenase, 2-oxoaldehyde dehydrogenase (NAD$^+$), succinate-semialdehyde dehydrogenase (NAD$^+$), 2-oxoisovalerate dehydrogenase (acylating), 2,5-dioxovalerate dehydrogenase, methylmalonate-semialdehyde dehydrogenase (acylating), benzaldehyde dehydrogenase (NAD$^+$), aryl-aldehyde dehydrogenase, aryl-aldehyde dehydrogenase (NADP$^+$), L-aminoadipate-semialdehyde dehydrogenase, aminomuconate-semialdehyde dehydrogenase, (R)-dehydropantoate dehydrogenase, retinal dehydrogenase, N-acetyl-γ-glutamyl-phosphate reductase, phenylacetaldehyde dehydrogenase, 3α,7α,12α-trihydroxycholestan-26-al 26-oxidoreductase, glutamate-5-semialdehyde dehydrogenase, hexadecanal dehydrogenase (acylating), formate dehydrogenase (NADP$^+$), cinnamoyl-CoA reductase, formaldehyde dehydrogenase, 4-trimethylammoniobutyraldehyde dehydrogenase, long-chain-aldehyde dehydrogenase, 2-oxoaldehyde dehydrogenase (NADP$^+$), long-chain-fatty-acyl-CoA reductase, pyruvate dehydrogenase (NADP$^+$), oxoglutarate dehydrogenase (NADP$^+$), 4-hydroxyphenylacetaldehyde dehydrogenase, γ-guanidinobutyraldehyde dehydrogenase, butanal dehydrogenase, phenylglyoxylate dehydrogenase (acylating), glyceraldehyde-3-phosphate dehydrogenase (NAD(P)$^+$) (phosphorylating), 5-carboxymethyl-2-hydroxymuconic-semialdehyde dehydrogenase, 4-hydroxymuconic-semialdehyde dehydrogenase, 4-formylbenzenesulfonate dehydrogenase, 6-oxohexanoate dehydrogenase, 4-hydroxybenzaldehyde dehydrogenase, salicylaldehyde dehydrogenase, vanillin dehydrogenase, coniferyl-aldehyde dehydrogenase, fluoroacetaldehyde dehydrogenase, glutamyl-tRNA reductase, succinylglutamate-semialdehyde dehydrogenase, erythrose-4-phosphate dehydrogenase, sulfoacetaldehyde dehydrogenase, abietadienal dehydrogenase, malonyl CoA reductase (malonate semialdehyde-forming), succinate-semialdehyde dehydrogenase (acetylating), 3,4-dehydroadipyl-CoA semialdehyde dehydrogenase (NADP$^+$), 2-formylbenzoate dehydrogenase, succinate-semialdehyde dehydrogenase (NADP$^+$), long-chain acyl-[acyl-carrier-protein] reductase, sulfoacetaldehyde dehydrogenase (acylating), and β-apo-4'-carotenal oxygenase); or with a cytochrome as acceptor (including formate dehydrogenase (cytochrome), formate dehydrogenase (cytochrome-c-553), and carbon-monoxide dehydrogenase (cytochrome-b-561)); or with oxygen as acceptor (including aldehyde oxidase, pyruvate oxidase, oxalate oxidase, glyoxylate oxidase, pyruvate oxidase (CoA-acetylating), indole-3-acetaldehyde oxidase, pyridoxal oxidase, aryl-aldehyde oxidase, retinal oxidase, 4-hydroxyphenylpyruvate oxidase, and abscisic aldehyde oxidase); or with a disulfide as acceptor (including pyruvate dehydrogenase (acetyl-transferring), oxoglutarate dehydrogenase (succinyl-transferring), and 3-methyl-2-oxobutanoate dehydrogenase (2-methylpropanoyl-transferring)); or with a quinone or similar compound as acceptor (including pyruvate dehydrogenase (quinone)); or with an iron-sulfur protein as acceptor (including pyruvate synthase, 2-oxobutyrate synthase, 2-oxoglutarate synthase, carbon-monoxide dehydrogenase (ferredoxin), aldehyde ferredoxin oxidoreductase, glyceraldehyde-3-phosphate dehydrogenase (ferredoxin), 3-methyl-2-oxobutanoate dehydrogenase (ferredoxin), indolepyruvate ferredoxin oxidoreductase, and oxalate oxidoreductase); or with other acceptors (including carbon-monoxide dehydrogenase (acceptor), aldehyde dehydrogenase (pyrroloquinoline-quinone), formaldehyde dismutase, formylmethanofuran dehydrogenase, carboxylate reductase, and aldehyde dehydrogenase (FAD-independent)).

The oxidoreductases which act on the CH—CH group of donors can include, but are not limited to, those with NAD+ or NADP+ as acceptor (e.g., dihydropyrimidine dehydrogenase (NAD$^+$), dihydropyrimidine dehydrogenase (NADP$^+$), $\Delta^4$-3-oxosteroid 5β-reductase, cortisone α-reductase, cucurbitacin $\Delta^{23}$-reductase, fumarate reductase (NADH), mesotartrate dehydrogenase, acyl-CoA dehydrogenase (NADP$^+$), enoyl-[acyl-carrier-protein] reductase (NADH), enoyl-[acyl-carrier-protein] reductase (NADPH, B-specific), 2-coumarate reductase, prephenate dehydrogenase, prephenate dehydrogenase (NADP$^+$), dihydroorotate dehydrogenase (NAD$^+$), dihydroorotate dehydrogenase (NADP$^+$), β-nitroacrylate reductase, 3-methyleneoxindole reductase, kynurenate-7,8-dihydrodiol dehydrogenase, cis-1,2-dihydrobenzene-1,2-diol dehydrogenase, trans-1,2-dihydrobenzene-1,2-diol dehydrogenase, 7-dehydrocholesterol reductase, cholestenone 5α-reductase, biliverdin reductase, 1,6-dihydroxycyclohexa-2,4-diene-1-carboxylate dehydrogenase, dihydrodipicolinate reductase, 2-hexadecenal reductase, 2,3-dihydro-2,3-dihydroxybenzoate dehydrogenase, cis-1,2-dihydro-1,2-dihydroxynaphthalene dehydrogenase, progesterone 5α-reductase, 2-enoate reductase, maleylacetate reductase, protochlorophyllide reductase, 2,4-dienoyl-CoA reductase (NADPH), phosphatidylcholine desaturase, geissoschizine dehydrogenase, cis-2-enoyl-CoA reductase (NADPH), trans-2-enoyl-CoA reductase (NADPH), enoyl-[acyl-carrier-protein] reductase (NADPH, A-specific), 2-hydroxy-6-oxo-6-phenylhexa-2,4-dienoate reductase, xanthommatin reductase, 12-oxophytodienoate reductase, arogenate dehydrogenase, trans-2-enoyl-CoA reductase (NAD$^+$), 2'-hydroxyisoflavone reductase, biochanin-A reductase, α-santonin 1,2-reductase, 15-oxoprostaglandin 13-oxidase, cis-3,4-dihydrophenanthrene-3,4-diol dehydrogenase, 2'-hydroxydaidzein reductase, 2-methyl-branched-chain-enoyl-CoA reductase, (3S,4R)-3,4-dihydroxycyclohexa-1,5-diene-1,4-dicarboxylate dehydrogenase, precorrin-6A reductase, cis-2,3-dihydrobiphenyl-2,3-diol dehydrogenase, phloroglucinol reductase, 2,3-dihydroxy-2,3-dihydro-p-cumate dehydrogenase, dibenzothiophene dihydrodiol dehydrogenase, terephthalate 1,2-cis-dihydrodiol dehydrogenase, pimeloyl-CoA dehydrogenase, 2,4-dichlorobenzoyl-CoA reductase, phthalate 4,5-cis-dihydrodiol dehydrogenase, 5,6-dihydroxy-3-methyl-2-oxo-1,2,5,6-tetrahydroquinoline dehydrogenase, cis-dihydroethylcatechol dehydrogenase, cis-1,2-dihydroxy-4-methylcyclohexa-3,5-diene-1-carboxylate dehydrogenase, 1,2-dihydroxy-6-methylcyclohexa-3,5-dienecarboxylate dehydrogenase, zeatin reductase, $\Delta^{14}$-sterol reductase, $\Delta^{24(241)}$-sterol reductase, $\Delta^{24}$-sterol reductase, 1,2-dihydrovomilenine reductase, 2-alkenal reductase, divinyl chlorophyllide a 8-vinyl-reductase, precorrin-2 dehydrogenase, anthocyanidin reductase, arogenate dehydrogenase (NADP$^+$), arogenate dehydrogenase [NAD(P)$^+$], red chlorophyll catabolite reductase, (+)-pulegone reductase, (−)-isopiperitenone reductase, geranylgeranyl diphosphate reductase acrylyl-CoA reductase (NADPH), crotonyl-CoA carboxylase/reductase, crotonyl-CoA reductase, 3-(cis-5,6-dihydroxycyclohexa-1,3-dien-1-yl)propanoate dehydrogenase, tRNA-dihydrouridine$^{16/17}$ synthase [NAD(P)$^+$], tRNA-dihydrouridine$^{47}$ synthase [NAD(P)$^+$], tRNA-dihydrouridine$^{20a/20b}$ synthase [NAD(P)$^+$], and tRNA-dihydrouridine$^{20}$ synthase [NAD(P)$^+$]) or with a cytochrome as acceptor, e.g. L-galactonolactone dehydrogenase, or with oxygen as acceptor (e.g., coproporphyrinogen oxidase, protoporphyrinogen oxidase, bilirubin oxidase, acyl-CoA oxidase, dihydrouracil oxidase, tetrahydroberberine oxidase, secologanin synthase, tryptophan α,β-oxidase, pyrroloquinoline-quinone synthase, and L-galactonolactone oxidase), or with a quinine or related compound as acceptor (e.g., succinate dehydrogenase (ubiquinone), dihydroorotate dehydrogenase (quinone), protoporphyrinogen IX dehydrogenase (menaquinone), fumarate reductase (menaquinone), 15-cis-phytoene desaturase, and 9,9'-dicis-ζ-carotene desaturase), or with an iron-sulfur protein as acceptor (e.g., 6-hydroxynicotinate reductase, 15,16-dihydrobiliverdin:ferredoxin oxidoreductase, phycoerythrobilin:ferredoxin oxidoreductase, phytochromobilin:ferredoxin oxidoreductase, phycocyanobilin:ferredoxin oxidoreductase, phycoerythrobilin synthase, ferredoxin:protochlorophyllide reductase (ATP-dependent), benzoyl-CoA reductase, and 4-hydroxybenzoyl-CoA reductase) or with flavin as acceptor (e.g., butyryl-CoA dehydrogenase or 4,4'-diapophytoene desaturase), or with other, known acceptors (e.g., dihydroorotate dehydrogenase (fumarate)), or with other acceptors (e.g., succinate dehydrogenase, acyl-CoA dehydrogenase, 3-oxosteroid 1-dehydrogenase, 3-oxo-5α-steroid 4-dehydrogenase, 3-oxo-5β-steroid 4-dehydrogenase, glutaryl-CoA dehydrogenase, 2-furoyl-CoA dehydrogenase, isovaleryl-CoA dehydrogenase, 2-methylacyl-CoA dehydrogenase, long-chain-acyl-CoA dehydrogenase, cyclohexanone dehydrogenase, isoquinoline 1-oxidoreductase, quinoline 2-oxidoreductase, quinaldate 4-oxidoreductase, quinoline-4-carboxylate 2-oxidoreductase, (R)-benzylsuccinyl-CoA dehydrogenase, coproporphyrinogen dehydrogenase, all-trans-retinol 13,14-reductase, 2-amino-4-deoxychorismate dehydrogenase, carvone reductase, all-trans-ζ-carotene desaturase, 1-hydroxycarotenoid 3,4-desaturase, phytoene desaturase (neurosporene-forming), phytoene desaturase (ζ-carotene-forming), phytoene desaturase (3,4-didehydrolycopene-forming), and phytoene desaturase (lycopene-forming)).

The oxidoreductases which act on the CH—NH$_2$ group of donors can include, but are not limited to, those with NAD$^+$ or NADP$^+$ as acceptor (e.g., alanine dehydrogenase, glutamate dehydrogenase, glutamate dehydrogenase [NAD(P)$^+$], glutamate dehydrogenase (NADP$^+$), L-amino-acid dehydrogenase, serine 2-dehydrogenase, valine dehydrogenase (NADP$^+$), leucine dehydrogenase, glycine dehydrogenase, L-erythro-3,5-diaminohexanoate dehydrogenase, 2,4-diaminopentanoate dehydrogenase, glutamate synthase (NADPH), glutamate synthase (NADH), lysine dehydrogenase, diaminopimelate dehydrogenase, N-methylalanine dehydrogenase, lysine 6-dehydrogenase, tryptophan dehydrogenase, phenylalanine dehydrogenase, and aspartate dehydrogenase), or with a chyochrome as acceptor (e.g. glycine dehydrogenase (cytochrome)), or with oxygen as acceptor (e.g. D-aspartate oxidase, L-amino-acid oxidase, D-amino-acid oxidase, amine oxidase, pyridoxal 5'-phosphate synthase, D-glutamate oxidase, ethanolamine oxidase, putrescine oxidase, L-glutamate oxidase, cyclohexylamine oxidase, protein-lysine 6-oxidase, L-lysine oxidase, D-glutamate(D-aspartate) oxidase, L-aspartate oxidase, glycine oxidase, L-lysine 6-oxidase, primary-amine oxidase, diamine oxidase, and 7-chloro-L-tryptophan oxidase), or with a disulfide as acceptor (e.g. glycine dehydrogenase (decarboxylating)), or with a quinine or similar compound as acceptor (e.g. D-amino acid dehydrogenase (quinone)) or with an iron-sulfur protein as acceptor (e.g. glutamate synthase (ferredoxin)), or with a copper protein as acceptor (e.g. methylamine dehydrogenase (amicyanin) and aralkylamine dehydrogenase (azurin)), and with other acceptors (e.g D-amino-acid dehydrogenase, taurine dehydrogenase, and glycine dehydrogenase (cyanide-forming)).

The oxidoreductases which act on the CH—NH group of donors can include, but are not limited to, those with NAD$^+$ or NADP$^+$ as acceptor (e.g., pyrroline-2-carboxylate reductase, pyrroline-5-carboxylate reductase, dihydrofolate reductase, methylenetetrahydrofolate dehydrogenase (NADP$^+$), formyltetrahydrofolate dehydrogenase, saccharopine dehydrogenase (NAD$^+$, L-lysine-forming), saccharopine dehydrogenase (NADP$^+$, L-lysine-forming), saccharopine dehydrogenase (NAD$^+$, L-glutamate-forming), saccharopine dehydrogenase (NADP$^+$, L-glutamate-forming), D-octopine dehydrogenase, 1-pyrroline-5-carboxylate dehydrogenase, methylenetetrahydrofolate dehydrogenase (NAD$^+$), D-lysopine dehydrogenase, alanopine dehydrogenase, ephedrine dehydrogenase, D-nopaline dehydrogenase, methylenetetrahydrofolate reductase [NAD(P)H], $\Delta^1$-piperideine-2-carboxylate reductase, strombine dehydrogenase, tauropine dehydrogenase, N$^5$-(carboxyethyl)ornithine synthase, thiomorpholine-carboxylate dehydrogenase, β-alanopine dehydrogenase, 1,2-dehydroreticulinium reductase (NADPH), opine dehydrogenase, flavin reductase (NADPH), berberine reductase, vomilenine reductase, pteridine reductase, 6,7-dihydropteridine reductase, flavin reductase (NADH), FAD reductase (NADH), FMN reductase (NADPH), FMN reductase [NAD(P)H], 8-hydroxy-5-deazaflavin:NADPH oxidoreductase, riboflavin reductase [NAD(P)H], and FMN reductase (NADH)), with oxygen as acceptor (e.g., sarcosine oxidase, N-methyl-L-amino-acid oxidase, N$^6$-methyl-lysine oxidase, (S)-6-hydroxynicotine oxidase, (R)-6-hydroxynicotine oxidase, L-pipecolate oxidase, dimethylglycine oxidase, dihydrobenzophenanthridine oxidase, N$^1$-acetylpolyamine oxidase, polyamine oxidase (propane-1,3-diamine-forming), N$^8$-acetylspermidine oxidase (propane-1,3-diamine-forming), spermine oxidase, non-specific polyamine oxidase, and L-saccharopine oxidase), with a disulfide as acceptor (e.g. pyrimidodiazepine synthase), with a quinine or similar compound as acceptor (e.g. electron-transferring-flavoprotein dehydrogenase), with an iron-sulfur protein as acceptor (e.g. methylenetetrahydrofolate reductase (ferredoxin)), with a flavin as acceptor (e.g. dimethylamine dehydrogenase, and trimethylamine dehydrogenase), and with other acceptors (e.g., sarcosine dehydrogenase, dimethylglycine dehydrogenase, L-pipecolate dehydrogenase, nicotine dehydrogenase, methylglutamate dehydrogenase, spermidine dehydrogenase, proline dehydrogenase, methylenetetrahydromethanopterin dehydrogenase, 5,10-methylenetetrahydromethanopterin reductase, cytokinin dehydrogenase, and D-proline dehydrogenase).

The oxidoreductases which act on NADH or NADPH can include, but are not limited to, those with $NAD^+$ or $NADP^+$ as acceptor (e.g., $NAD(P)^+$ transhydrogenase (B-specific), and $NAD(P)^+$ transhydrogenase (AB-specific)), with a heme protein as acceptor (e.g. cytochrome-$b_5$ reductase, NADPH-hemoprotein reductase, NADPH-cytochrome-$c_2$ reductase, and leghemoglobin reductase), with oxygen as acceptor (e.g. NAD(P)H oxidase), with a quinine or similar compound as acceptor (e.g., NAD(P)H dehydrogenase (quinone), NADH:ubiquinone reductase ($H^+$-translocating), monodehydroascorbate reductase (NADH), NADPH:quinone reductase, p-benzoquinone reductase (NADPH), 2-hydroxy-1,4-benzoquinone reductase, NADH:ubiquinone reductase ($Na^+$-transporting), NADH:ubiquinone reductase (non-electrogenic), and NADPH dehydrogenase (quinone)), with a nitrogenous group as acceptor (e.g. trimethylamine-N-oxide reductase), with an iron-sulfur protein as acceptor, with a flavin as acceptor, and with other acceptors (e.g, NADPH dehydrogenase, NADH dehydrogenase, NADH dehydrogenase (quinone)).

The oxidoreductases which act on other nitrogenous compounds as donors can include, but are not limited to, those with $NAD^+$ or $NADP^+$ as acceptor (e.g., nitrate reductase (NADH), nitrate reductase [NAD(P)H], nitrate reductase (NADPH), nitrite reductase [NAD(P)H], hyponitrite reductase, azobenzene reductase, GMP reductase, nitroquinoline-N-oxide reductase, hydroxylamine reductase (NADH), 4-(dimethylamino)phenylazoxybenzene reductase, N-hydroxy-2-acetamidofluorene reductase, $preQ_1$ reductase, and nitric oxide reductase [NAD(P), nitrous oxide-forming]), with a cytochrome as acceptor (e.g. nitrite reductase (NO-forming), nitrite reductase (cytochrome; ammonia-forming), trimethylamine-N-oxide reductase (cytochrome c), nitrous-oxide reductase, and nitric oxide reductase (cytochrome c)), with oxygen as acceptor (e.g., nitroalkane oxidase, acetylindoxyl oxidase, factor-independent urate hydroxylase, hydroxylamine oxidase, and 3-acinitropropanoate oxidase), with a quinone or similar compound as acceptor (e.g. nitrate reductase (quinone) and nitric oxide reductase (menaquinol)), with a nitrogenous group as acceptor (e.g. nitrite dismutase), with an iron-sulfur protein as acceptor (e.g, ferredoxing nitrite reductase and ferredoxing nitrate reductase), and with other acceptors (e.g., hydroxylamine reductase, nitrate reductase, and hydrazine oxidoreductase).

The oxidoreductases which act on a sulfur group of donors can include, but are not limited to, those with $NAD^+$ or $NADP^+$ as acceptor (e.g., sulfite reductase (NADPH), hypotaurine dehydrogenase, dihydrolipoyl dehydrogenase, 2-oxopropyl-CoM reductase (carboxylating), cystine reductase, glutathione-disulfide reductase, protein-disulfide reductase, thioredoxin-disulfide reductase, CoA-glutathione reductase, asparagusate reductase, trypanothione-disulfide reductase, bis-γ-glutamylcystine reductase, CoA-disulfide reductase, mycothione reductase, glutathione amide reductase, and dimethylsulfone reductase), with a cytochrome as acceptor (e.g., sulfite dehydrogenase, thiosulfate dehydrogenase sulfide-cytochrome-c reductase (flavocytochrome c), and dimethyl sulfide:cytochrome $c_2$ reductase), with oxygen as acceptor (e.g. sulfite oxidase, thiol oxidase, glutathione oxidase, methanethiol oxidase, prenylcysteine oxidase, and farnesylcysteine lyase), with a disulfide as acceptor (e.g., glutathione-homocystine transhydrogenase, protein-disulfide reductase (glutathione), glutathione-CoA-glutathione transhydrogenase, glutathione-cystine transhydrogenase, enzyme-thiol transhydrogenase (glutathione-disulfide), phosphoadenylyl-sulfate reductase (thioredoxin), adenylyl-sulfate reductase (glutathione), adenylyl-sulfate reductase (thioredoxin), peptide-methionine (S)—S-oxide reductase, peptide-methionine (R)—S-oxide reductase, L-methionine (S)—S-oxide reductase, and L-methionine (R)—S-oxide reductase), with a quinine or similar compound as acceptor (e.g., glutathione dehydrogenase (ascorbate), thiosulfate dehydrogenase (quinone), dimethylsulfoxide reductase, and sulfide:quinone reductase), with a nitrogenous group as acceptor, with an iron-sulfur protein as acceptor (e.g. sulfite reductase (ferredoxin) and ferredoxin:thioredoxin reductase), with other, known acceptors (e.g. CoB-CoM heterodisulfide reductase and sulfiredoxin), and with other acceptors (e.g. sulfite reductase, adenylyl-sulfate reductase, and hydrogensulfite reductase).

The oxidoreductases which act on a heme group of donors can include, but are not limited to, those with oxygen as acceptor (e.g., cytochrome-c oxidase), with a nitrogenous group as acceptor (e.g. nitrate reductase (cytochrome)), and with other acceptors (e.g. iron-cytochrome-c reductase).

The oxidoreductases which act on diphenols and related substances as donors can include, but are not limited to, those with $NAD^+$ or $NADP^+$ as acceptor (e.g. trans-acenaphthene-1,2-diol dehydrogenase), with a cytochrome as acceptor (e.g. L-ascorbate-cytochrome-$b_5$reductase and ubiquinol-cytochrome-c reductase), with oxygen as acceptor (e.g., catechol oxidase, laccase, L-ascorbate oxidase, o-aminophenol oxidase, 3-hydroxyanthranilate oxidase, rifamycin-B oxidase, photosystem II, ubiquinol oxidase ($H^+$-transporting), ubiquinol oxidase, and menaquinol oxidase ($H^+$-transporting)), and with other acceptors (e.g., plastoquinol-plastocyanin reductase, ribosyldihydronicotinamide dehydrogenase (quinone), and violaxanthin de-epoxidase).

The oxidoreductases which act on peroxide as acceptor can include, but are not limited to, peroxidases (e.g., NADH peroxidase, NADPH peroxidase, fatty-acid peroxidase, cytochrome-c peroxidase, catalase, peroxidase, iodide peroxidase, glutathione peroxidase, chloride peroxidase, L-ascorbate peroxidase, phospholipid-hydroperoxide glutathione peroxidase, manganese peroxidase, lignin peroxidase, peroxiredoxin, versatile peroxidase, glutathione amide-dependent peroxidase, bromide peroxidase, dye decolorizing peroxidase, prostamide/prostaglandin $F_{2\alpha}$ synthase, catalase-peroxidase) and those with $H_2O_2$ as acceptor, one oxygen atom of which is incorporated into the product (e.g. unspecific peroxygenase, myeloperoxidase, plant seed peroxygenase, and fatty-acid peroxygenase).

The oxidoreductases which act on hydrogen as donor can include, but are not limited to, those with $NAD^+$ or $NADP^+$ as acceptor (e.g., hydrogen dehydrogenase, hydrogen dehydrogenase ($NADP^+$), and hydrogenase ($NAD^+$, ferredoxin)), with a cytochrome as acceptor (e.g. cytochrome-$c_3$ hydrogenase), with a quinine or similar compound as acceptor (e.g., hydrogen:quinone oxidoreductase), with an iron-sulfur protein as acceptor (e.g. ferredoxin hydrogenase), with other known acceptors (e.g., coenzyme $F_{420}$ hydrogenase, 5,10-methenyltetrahydromethanopterin hydrogenase, and *Methanosarcina*-phenazine hydrogenase), and with other acceptors (e.g. hydrogenase (acceptor)).

The oxidoreductases which act on single donors with incorporation of molecular oxygen (oxygenases) can include, but are not limited to, those with incorporation of two atoms of oxygen (e.g., catechol 1,2-dioxygenase, catechol 2,3-dioxygenase, protocatechuate 3,4-dioxygenase, gentisate 1,2-dioxygenase, homogentisate 1,2-dioxygenase, 3-hydroxyanthranilate 3,4-dioxygenase, protocatechuate 4,5-dioxygenase, 2,5-dihydroxypyridine 5,6-dioxygenase, or 7,8-dihydroxykynurenate 8,8a-dioxygenase, tryptophan 2,3-dioxygenase, linoleate 13S-lipoxygenase, ascorbate 2,3-dioxygenase, 2,3-dihydroxybenzoate 3,4-dioxygenase, 3,4-dihydroxyphenylacetate 2,3-dioxygenase, 3-carboxyethylcatechol 2,3-dioxygenase, indole 2,3-dioxygenase, sulfur dioxygenase, cysteamine dioxygenase, cysteine dioxygenase, caffeate 3,4-dioxygenase, 2,3-dihydroxyindole 2,3-dioxygenase, quercetin 2,3-dioxygenase, 3,4-dihydroxy-9,10-secoandrosta-1,3,5(10)-triene-9,17-dione 4,5-dioxygenase, peptide-tryptophan 2,3-dioxygenase, 4-hydroxyphenylpyruvate dioxygenase, 2,3-dihydroxybenzoate 2,3-dioxygenase, stizolobate synthase, stizolobinate synthase, arachidonate 12-lipoxygenase, arachidonate 15-lipoxygenase, arachidonate 5-lipoxygenase, pyrogallol 1,2-oxygenase, chloridazon-catechol dioxygenase, hydroxyquinol 1,2-dioxygenase, 1-hydroxy-2-naphthoate 1,2-dioxygenase, biphenyl-2,3-diol 1,2-dioxygenase, arachidonate 8-lipoxygenase, 2,4'-dihydroxyacetophenone dioxygenase, lignostilbene αβ-dioxygenase, linoleate diol synthase, linoleate 11-lipoxygenase, 4-hydroxymandelate synthase, 3-hydroxy-4-oxoquinoline 2,4-dioxygenase, 3-hydroxy-2-methyl-quinolin-4-one 2,4-dioxygenase, chlorite $O_2$-lyase, acetylacetone-cleaving enzyme, 9-cis-epoxycarotenoid dioxygenase, indoleamine 2,3-dioxygenase, acireductone dioxygenase ($Ni^{2+}$-requiring), acireductone dioxygenase [iron(II)-requiring], sulfur oxygenase/reductase, 1,2-dihydroxynaphthalene dioxygenase, gallate dioxygenase, linoleate 9S-lipoxygenase, and torulene dioxygenase), with incorporation of one atom of oxygen (internal monooxygenases or internal mixed function oxidases) (e.g., arginine 2-monooxygenase, lysine 2-monooxygenase, tryptophan 2-monooxygenase, lactate 2-monooxygenase, *Renilla*-luciferin 2-monooxygenase, *Cypridina*-luciferin 2-monooxygenase, *Photinus*-luciferin 4-monooxygenase (ATP-hydrolysing), *Watasenia*-luciferin 2-monooxygenase, phenylalanine 2-monooxygenase, apo-β-carotenoid-14',13'-dioxygenase, *Oplophorus*-luciferin 2-monooxygenase, 3,4-dihydroxyphenylalanine oxidative deaminase, nitronate monooxygenase, dichloroarcyriaflavin A synthase, dinoflagellate luciferase, and 2-oxuglutarate dioxygenase (ethylene-forming)), inositol oxygenase, and tryptophan 2'-dioxygenase.

The oxidoreductases which act on paired donors, with incorporation or reduction of molecular oxygen can include, but are not limited to, those with ascorbate as one donor, with reduced pteridine as one donor, with 2-oxoglutarate as one donor, and incorporation of one atom each of oxygen into both donors (e.g. γ-butyrobetaine dioxygenase, procollagen-proline dioxygenase, pyrimidine-deoxynucleoside 2'-dioxygenase, procollagen-lysine 5-dioxygenase, thymine dioxygenase, procollagen-proline 3-dioxygenase, trimethyllysine dioxygenase, flavanone 3-dioxygenase, pyrimidine-deoxynucleoside 1'-dioxygenase, hyoscyamine (6S)-dioxygenase, gibberellin-44 dioxygenase, gibberellin 2β-dioxygenase, 6β-hydroxyhyoscyamine epoxidase, gibberellin 3β-dioxygenase, peptide-aspartate β-dioxygenase, taurine dioxygenase, phytanoyl-CoA dioxygenase, leucocyanidin oxygenase, deacetoxyvindoline 4-hydroxylase, clavaminate synthase, flavone synthase, flavonol synthase, 2'-deoxymugineic-acid 2'-dioxygenase, mugineic-acid 3-dioxygenase, deacetoxycephalosporin-C hydroxylase, [histone-H3]-lysine-36 demethylase, proline 3-hydroxylase, hypoxia-inducible factor-proline dioxygenase, hypoxia-inducible factor-asparagine dioxygenase, thebaine 6-O-demethylase, codeine 3-O-demethylase, DNA oxidative demethylase, and 2-oxoglutarate/L-arginine monooxygenase/decarboxylase (succinate-forming)), with NADH or NADPH as one donor, and incorporation of two atoms of oxygen into one donor (e.g., anthranilate 1,2-dioxygenase (deaminating, decarboxylating), benzene 1,2-dioxygenase, 3-hydroxy-2-methylpyridinecarboxylate dioxygenase, 5-pyridoxate dioxygenase, phthalate 4,5-dioxygenase, 4-sulfobenzoate 3,4-dioxygenase, 4-chlorophenylacetate 3,4-dioxygenase, benzoate 1,2-dioxygenase, toluene dioxygenase, naphthalene 1,2-dioxygenase, 2-chlorobenzoate 1,2-dioxygenase, 2-aminobenzenesulfonate 2,3-dioxygenase, terephthalate 1,2-dioxygenase, 2-hydroxyquinoline 5,6-dioxygenase, nitric oxide dioxygenase, biphenyl 2,3-dioxygenase, 3-phenylpropionate dioxygenase, pheophorbide a oxygenase, benzoyl-CoA 2,3-dioxygenase, and carbazole 1,9a-dioxygenase), with NADH or NADPH as one donor, and incorporation of one atom of oxygen (e.g., salicylate 1-monooxygenase, 4-hydroxybenzoate 3-monooxygenase, melilotate 3-monooxygenase, imidazoleacetate 4-monooxygenase, orcinol 2-monooxygenase, phenol 2-monooxygenase, flavin-containing monooxygenase, kynurenine 3-monooxygenase, 2,6-dihydroxypyridine 3-monooxygenase, trans-cinnamate 4-monooxygenase, benzoate 4-monooxygenase, calcidiol 1-monooxygenase, trans-cinnamate 2-monooxygenase, cholestanetriol 26-monooxygenase, cyclopentanone monooxygenase, cholesterol 7α-monooxygenase, 4-hydroxyphenylacetate 1-monooxygenase, taxifolin 8-monooxygenase, 2,4-dichlorophenol 6-monooxygenase, flavonoid 3'-monooxygenase, cyclohexanone monooxygenase, 3-hydroxybenzoate 4-monooxygenase, 3-hydroxybenzoate 6-monooxygenase, methane monooxygenase (soluble), phosphatidylcholine 12-monooxygenase, 4-aminobenzoate 1-monooxygenase, 3,9-dihydroxypterocarpan 6a-monooxygenase, 4-nitrophenol 2-monooxygenase, leukotriene-$B_4$ 20-monooxygenase, 2-nitrophenol 2-monooxygenase, albendazole monooxygenase, 4-hydroxybenzoate 3-monooxygenase [NAD(P)H], leukotriene-$E_4$ 20-monooxygenase, anthranilate 3-monooxygenase (deaminating), 5-O-(4-coumaroyl)-D-quinate 3'-monooxygenase, methyltetrahydroprotoberberine 14-monooxygenase, anhydrotetracycline monooxygenase, nitric-oxide synthase, anthraniloyl-CoA monooxygenase, tyrosine N-monooxygenase, questin monooxygenase, 2-hydroxybiphenyl 3-monooxygenase, (−)-menthol monooxygenase, (S)-limonene 3-monooxygenase, (S)-limonene 6-monooxygenase, (S)-limonene 7-monooxygenase, pentachlorophenol monooxygenase, 6-oxocineole dehydrogenase, isoflavone 3'-hydroxylase, 4'-methoxyisoflavone 2'-hydroxylase, ketosteroid monooxygenase, protopine 6-monooxygenase, dihydrosanguinarine 10-monooxygenase, dihydrochelirubine 12-monooxygenase, benzoyl-CoA 3-monooxygenase, L-lysine 6-monooxygenase (NADPH), 27-hydroxycholesterol 7α-monooxygenase, 2-hydroxyquinoline 8-monooxygenase, 4-hydroxyquinoline 3-monooxygenase, 3-hydroxyphenylacetate 6-hydroxylase, 4-hydroxybenzoate 1-hydroxylase, 2-hydroxycyclohexanone 2-monooxygenase, quinine 3-monooxygenase, 4-hydroxyphenylacetaldehyde oxime monooxygenase, alkene monooxygenase, sterol 14-demethylase, N-methylcoclaurine 3'-monooxygenase, methylsterol monooxygenase, tabersonine 16-hydroxylase, 7-deoxyloganin 7-hydroxylase, vinorine hydroxylase, taxane 10β-hydroxylase, taxane 13α-hydroxylase, ent-kaurene oxidase, ent-kaurenoic acid oxidase, (R)-limonene 6-monooxygenase, magnesium-protoporphyrin IX monomethyl ester (oxidative) cyclase, vanillate monooxygenase, precorrin-3B synthase, 4-hydroxyacetophenone monooxygenase, glyceollin synthase, 2-hydroxyisoflavanone synthase, licodione synthase, flavonoid 3',5'-hydroxylase, isoflavone 2'-hydroxylase, zeaxanthin epoxidase, deoxysarpagine hydroxylase, phenylacetone monooxygenase, (+)-abscisic acid 8'-hydroxylase, lithocholate 6β-hydroxylase, 7α-hydroxycholest-4-en-3-one 12α-hydroxylase, 5β-cholestane-3α,7α-diol 12α-hydroxylase, taurochenodeoxycholate 6α-hydroxylase, cholesterol 24-hydroxylase, 24-hydroxycholesterol 7α-hydroxylase, 25-hydroxycholesterol 7α-hydroxylase, senecionine N-oxygenase, psoralen synthase, 8-dimethylallylnaringenin 2'-hydroxylase, (+)-menthofuran synthase, monocyclic monoterpene ketone monooxygenase, epi-isozizaene 5-monooxygenase, limonene 1,2-monooxygenase, abietadiene hydroxylase, abietadienol hydroxylase, geranylgeraniol 18-hydroxylase, methanesulfonate monooxygenase, 3-epi-6-deoxocathasterone 23-monooxygenase, FAD-dependent urate hydroxylase, 6-hydroxynicotinate 3-monooxygenase, angelicin synthase, geranylhydroquinone 3''-hydroxylase, isoleucine N-monooxygenase, valine N-monooxygenase, 5-epiaristolochene 1,3-dihydroxylase, costunolide synthase, premnaspirodiene oxygenase, chlorophyllide-α oxygenase, germacrene A hydroxylase, phenylalanine N-monooxygenase, tryptophan N-monooxygenase, vitamin $D_3$ 24-hydroxylase, 3-β-hydroxyphenyl)propanoate hydroxylase, 7-methylxanthine demethylase, β-carotene 3-hydroxylase, pyrrole-2-carboxylate monooxygenase, dimethyl-sulfide monooxygenase, and squalene monooxygenase, with reduced flavin or flavoprotein as one donor, and incorporation of one atom of oxygen (e.g., unspecific monooxygenase, alkanal monooxygenase (FMN-linked), alkanesulfonate monooxygenase, tryptophan 7-halogenase, anthranilate 3-monooxygenase (FAD), 4-hydroxyphenylacetate 3-monooxygenase, and nitrilotriacetate monooxygenase), with reduced iron-sulfur protein as one donor, and incorporation of one atom of oxygen (e.g., camphor 5-monooxygenase, camphor 1,2-monooxygenase, alkane 1-monooxygenase, steroid 11β-monooxygenase, corticosterone 18-monooxygenase, cholesterol monooxygenase (side-chain-cleaving), choline monooxygenase, and steroid 15β-monooxygenase), with reduced pteridine as one donor, and incorporation of one atom of oxygen (e.g., phenylalanine 4-monooxygenase, tyrosine 3-monooxygenase, anthranilate 3-monooxygenase, tryptophan 5-monooxygenase, alkylglycerol monooxygenase, and mandelate 4-monooxygenase), with reduced ascorbate as one donor, and incorporation of one atom of oxygen (e.g, dopamine β-monooxygenase, peptidylglycine monooxygenase, and aminocyclopropanecarboxylate oxidase), with another compound as one donor, and incorporation of one atom of oxygen (e.g., monophenol monooxygenase, CMP-N-acetylneuraminate monooxygenase, and methane monooxygenase (particulate)), with oxidation of a pair of donors resulting in the reduction of molecular oxygen to two molecules of water (e.g., stearoyl-CoA 9-desaturase, acyl-[acyl-carrier-protein] desaturase, linoleoyl-CoA desaturase, $\Delta^8$-fatty-acid desaturase, $\Delta^{11}$-fatty-acid desaturase, $\Delta^{12}$-fatty-acid desaturase, and (S)-2-hydroxypropylphosphonic acid epoxidase), with 2-oxoglutarate as one donor, and the other dehydrogenated (e.g. deacetoxycephalosporin-C synthase), with NADH or NADPH as one donor, and the other dehydrogenated (e.g., (S)-stylopine synthase, (S)-cheilanthifoline synthase, berbamunine synthase, salutaridine synthase, (S)-canadine synthase, lathosterol oxidase, biflaviolin synthase, pseudobaptigenin synthase), and others including prostaglandin-endoperoxide synthase, kynurenine 7,8-hydroxylase, heme oxygenase, progesterone monooxygenase, steroid 17α-monooxygenase, steroid 21-monooxygenase, estradiol 63-monooxygenase, 4-androstene-3,17-dione monooxygenase, progesterone 11α-monooxygenase, 4-methoxybenzoate monooxygenase (O-demethylating), plasmanylethanolamine desaturase, phylloquinone monooxygenase (2,3-epoxidizing), Latia-luciferin monooxygenase (demethylating), ecdysone 20-monooxygenase, 3-hydroxybenzoate 2-monooxygenase, steroid 9α-monooxygenase, 2-hydroxypyridine 5-monooxygenase, juglone 3-monooxygenase, linalool 8-monooxygenase, deoxyhypusine monooxygenase, myristoyl-CoA 11-(E) desaturase, myristoyl-CoA 11-(Z) desaturase, $\Delta^{12}$-fatty acid dehydrogenase, monoprenyl isoflavone epoxidase, thiophene-2-carbonyl-CoA monooxygenase, β-carotene 15,15'-monooxygenase, taxadiene 5α-hydroxylase, cholesterol 25-hydroxylase, ammonia monooxygenase, 5,6-dimethylbenzimidazole synthase, all-trans-8'-apo-β-carotenal 15,15'-oxygenase, zeaxanthin 7,8-dioxygenase, β-amyrin 24-hydroxylase, diapolycopene oxygenase, and carotene ε-monooxygenase.

The oxidoreductases which act on superoxide as acceptor can include, but are not limited to, superoxide dismutase and superoxide reductase.

The oxidoreductases which act on metal ions can include, but are not limited to, those with $NAD^+$ or $NADP^+$ as acceptor (e.g., mercury(II) reductase, diferric-transferrin reductase, aquacobalamin reductase, cob(II)alamin reductase, aquacobalamin reductase (NADPH), cyanocobalamin reductase (cyanide-eliminating), ferric-chelate reductase (NADH), [methionine synthase] reductase, and ferric-chelate reductase (NADPH)), with oxygen as acceptor (e.g., ferroxidase), with quinone or similar compound as acceptor (e.g. ascorbate ferrireductase (transmembrane)), with flavin as acceptor (e.g. cob(II)yrinic acid a,c-diamide reductase), with other acceptors (e.g. iron:rusticyanin reductase).

The oxidoreductases which act on CH or $CH_2$ groups can include, but are not limited to, those with $NAD^+$ or $NADP^+$ as acceptor (e.g., CDP-4-dehydro-6-deoxyglucose reductase, 4-hydroxy-3-methylbut-2-enyl diphosphate reductase, leucoanthocyanidin reductase, xanthine dehydrogenase, and nicotinate dehydrogenase), with a cytochrome as acceptor (e.g. nicotinate dehydrogenase (cytochrome)), with oxygen as acceptor (e.g., pteridine oxidase, xanthine oxidase, and 6-hydroxynicotinate dehydrogenase), with a disulfide as acceptor (e.g., ribonucleoside-diphosphate reductase, and ribonucleoside-triphosphate reductase), with a quinine or similar compound as acceptor (e.g., phenylacetyl-CoA dehydrogenase and caffeine dehydrogenase), with an iron-sulfur protein as acceptor (e.g., (E)-4-hydroxy-3-methylbut-2-enyl-diphosphate synthase), and with other acceptors (e.g., 4-methylphenol dehydrogenase (hydroxylating), ethylbenzene hydroxylase, 3α,7α,12α-trihydroxy-5β-cholestanoyl-CoA 24-hydroxylase, uracil/thymine dehydrogenase, and bile-acid 7α-dehydroxylase).

The oxidoreductases which act on iron-sulfur proteins as donors can include, but are not limited to, those with NAD+ or NADP+ as acceptor (e.g., rubredoxin-$NAD^+$ reductase, ferredoxin-$NADP^+$ reductase, ferredoxin-$NAD^+$ reductase, and rubredoxin-$NAD(P)^+$ reductase), with $H^+$ as acceptor, and with dinitrogen as acceptor (e.g., nitrogenase).

The oxidoreductases which act on reduced flavodoxin as donor can include, but are not limited to, those with dinitrogen as acceptor (e.g., nitrogenase (flavodoxin)).

The oxidoreductases which act on phosphorus or arsenic in donors can include, but are not limited to, those with $NAD(P)^+$ as acceptor (e.g. phosphonate dehydrogenase), with a cytochrome as acceptor (e.g., arsenate reductase (cytochrome c)), with disulfide as acceptor (e.g., arsenate reductase (glutaredoxin), methylarsonate reductase, and mycoredoxin), with a copper protein as acceptor (e.g. arsenate reductase (azurin)), and with other acceptors (e.g. arsenate reductase (donor)).

The oxidoreductases which act on X—H and Y—H to form an X—Y bond can include, but are not limited to, those with oxygen as acceptor (e.g., isopenicillin-N synthase, columbamine oxidase, reticuline oxidase, sulochrin oxidase [(+)-bisdechlorogeodin-forming], sulochrin oxidase [(−)-bisdechlorogeodin-forming], and aureusidin synthase), with a disulfide as acceptor (e.g., D-proline reductase (dithiol), glycine reductase, sarcosine reductase, and betaine reductase), and with other acceptors (e.g., β-cyclopiazonate dehydrogenase).

The oxidoreductases which act on halogen in donors can include, but are not limited to, those with NAD$^+$ or NADP$^+$ as acceptor (e.g. iodotyrosine deiodinase).

Other oxidoreductases can include, but are not limited to, chlorate reductase, pyrogallol hydroxyltransferase, sulfur reductase, [formate-C-acetyltransferase]activating enzyme, tetrachloroethene reductive dehalogenase, selenate reductase, thyroxine 5'-deiodinase, thyroxine 5-deiodinase, and photosystem I).

Suitable oxidoreductases include various sugar oxidases, laccases, peroxidases and haloperoxidases.

Glycosylases

Glycosylases include glycosidases, i.e. enzymes hydrolyzing O- and S-glycosyl compounds, including but not limited to α-amylase, β-amylase, glucan 1,4-α-glucosidase, cellulase, endo-1,3(4)-β-glucanase, inulinase, endo-1,4-β-xylanase, oligo-1,6-glucosidase, dextranase, chitinase, polygalacturonase, lysozyme, exo-α-sialidase, α-glucosidase, β-glucosidase, α-galactosidase, β-galactosidase, α-mannosidase, β-mannosidase, β-fructofuranosidase, α,α-trehalase, β-glucuronidase, endo-1,3-β-xylanase, amylo-1,6-glucosidase, hyaluronoglucosaminidase, hyaluronoglucuronidase, xylan 1,4-β-xylosidase, β-D-fucosidase, glucan endo-1,3-β-D-glucosidase, α-L-rhamnosidase, pullulanase, GDP-glucosidase, β-L-rhamnosidase, fucoidanase, glucosylceramidase, galactosylceramidase, galactosylgalactosylglucosylceramidase, sucrose α-glucosidase, α-N-acetylglucosaminidase, α-N-acetylglucosaminidase, α-L-fucosidase, β-L-N-acetylhexosaminidase, β-N-acetylgalactosaminidase, cyclomaltodextrinase, α-N-arabinofuranosidase, glucuronosyl-disulfoglucosamine glucuronidase, isopullulanase, glucan 1,3-β-glucosidase, glucan endo-1,3-α-glucosidase, glucan 1,4-α-maltotetraohydrolase, mycodextranase, glycosylceramidase, 1,2-α-L-fucosidase, 2,6-β-fructan 6-levanbiohydrolase, levanase, quercitrinase, galacturan 1,4-α-galacturonidase, isoamylase, glucan 1,6-α-glucosidase, glucan endo-1,2-β-glucosidase, xylan 1,3-β-xylosidase, licheninase, glucan 1,4-β-glucosidase, glucan endo-1,6-β-glucosidase, L-iduronidase, mannan 1,2-(1,3)-α-mannosidase, mannan endo-1,4-β-mannosidase, fructan β-fructosidase, β-agarase, exo-poly-α-galacturonosidase, κ-carrageenase, glucan 1,3-α-glucosidase, 6-phospho-β-galactosidase, 6-phospho-β-glucosidase, capsular-polysaccharide endo-1,3-α-galactosidase, β-L-arabinosidase, arabinogalactan endo-1,4-β-galactosidase, cellulose 1,4-β-cellobiosidase (non-reducing end), peptidoglycan β-N-acetylmuramidase, α,α-phosphotrehalase, glucan 1,6-α-isomaltosidase, dextran 1,6-α-isomaltotriosidase, mannosyl-glycoprotein endo-β-N-acetylglucosaminidase, endo-α-N-acetylgalactosaminidase, glucan 1,4-α-maltohexaosidase, arabinan endo-1,5-α-L-arabinanase, mannan 1,4-mannobiosidase, mannan endo-1,6-α-mannosidase, blood-group-substance endo-1,4-β-galactosidase, keratan-sulfate endo-1,4-β-galactosidase, steryl-β-glucosidase, strictosidine β-glucosidase, mannosyl-oligosaccharide glucosidase, protein-glucosylgalactosylhydroxylysine glucosidase, lactase, endogalactosaminidase, 1,3-α-L-fucosidase, 2-deoxyglucosidase, mannosyl-oligosaccharide 1,2-α-mannosidase, mannosyl-oligosaccharide 1,3-1,6-α-mannosidase, branched-dextran exo-1,2-α-glucosidase, glucan 1,4-α-maltotriohydrolase, amygdalin β-glucosidase, prunasin β-glucosidase, vicianin β-glucosidase, oligoxyloglucan β-glycosidase, polymannuronate hydrolase, maltose-6'-phosphate glucosidase, endoglycosylceramidase, 3-deoxy-2-octulosonidase, raucaffricine β-glucosidase, coniferin β-glucosidase, 1,6-α-L-fucosidase, glycyrrhizinate β-glucuronidase, endo-α-sialidase, glycoprotein endo-α-1,2-mannosidase, xylan α-1,2-glucuronosidase, chitosanase, glucan 1,4-α-maltohydrolase, difructose-anhydride synthase, neopullulanase, glucuronoarabinoxylan endo-1,4-β-xylanase, mannan exo-1,2-1,6-α-mannosidase, α-glucuronidase, lacto-N-biosidase, 4-α-D-{(1→4)-α-D-glucano}trehalose trehalohydrolase, limit dextrinase, poly (ADP-ribose) glycohydrolase, 3-deoxyoctulosonase, galactan 1,343-galactosidase, β-galactofuranosidase, thioglucosidase, β-primeverosidase, oligoxyloglucan reducing-end-specific cellobiohydrolase, xyloglucan-specific endo-β-1,4-glucanase, mannosylglycoprotein endo-β-mannosidase, fructan β-(2,1)-fructosidase, fructan β-(2,6)-fructosidase, xyloglucan-specific exo-β-1,4-glucanase, oligosaccharide reducing-end xylanase, t-carrageenase, α-agarase, α-neoagaro-oligosaccharide hydrolase, β-apiosyl-β-glucosidase, k-carrageenase, 1,6-α-D-mannosidase, galactan endo-1,6-β-galactosidase, exo-1,4-β-D-glucosaminidase, heparanase, baicalin-β-D-glucuronidase, hesperidin 6-θ-α-L-rhamnosyl-β-D-glucosidase, protein O-GlcNAcase, mannosylglycerate hydrolase, rhamnogalacturonan hydrolase, unsaturated rhamnogalacturonyl hydrolase, rhamnogalacturonan galacturonohydrolase, rhamnogalacturonan rhamnohydrolase, β-D-glucopyranosyl abscisate β-glucosidase, cellulose 1,4-β-cellobiosidase (reducing end), α-D-xyloside xylohydrolase, and β-porphyranase.

Glycosylases also include hydrolyzing N-glycosyl compounds, including but not limited to purine nucleosidase, inosine nucleosidase, uridine nucleosidase, AMP nucleosidase, NAD$^+$ nucleosidase, NAD(P)$^+$ nucleosidase, adenosine nucleosidase, ribosylpyrimidine nucleosidase, adenosylhomocysteine nucleosidase, pyrimidine-5'-nucleotide nucleosidase, β-aspartyl-N-acetylglucosaminidase, inosinate nucleosidase, 1-methyladenosine nucleosidase, NMN nucleosidase, DNA-deoxyinosine glycosylase, methylthioadenosine nucleosidase, deoxyribodipyrimidine endonucleosidase, ADP-ribosylarginine hydrolase, DNA-3-methyladenine glycosylase I, DNA-3-methyladenine glycosylase II, rRNA N-glycosylase, DNA-formamidopyrimidine glycosylase, ADP-ribosyl-[dinitrogen reductase] hydrolase, N-methyl nucleosidase, futalosine hydrolase, uracil-DNA glycosylase, double-stranded uracil-DNA glycosylase, and thymine-DNA glycosylase, and hydrolyzing S-glycosyl compounds.

Hydrolases

Hydrolases of EC 3 include, but are not limited to: those acting on ester bonds; glycosylases, those acting on ether bonds; those acting on peptide bonds (peptidases/proteases); those acting on carbon-nitrogen bonds, other than peptide bonds; those acting on acid anhydrides; those acting on carbon-carbon bonds; those acting on halide bonds; those acting on phosphorus-nitrogen bonds; those acting on sulfur-nitrogen bonds; those acting on carbon-phosphorus bonds; those acting on sulfur-sulfur bonds; and those acting on carbon-sulfur bonds.

The hydrolases of EC 3 which act on ester bonds, can include, but are not limited to, carboxylic ester hydrolases (for example lipases including triacylglycerol lipase, phospholipase $A_1$, phospholipase $A_2$, lysophospholipase, acylglycerol lipase, galactolipase, lipoprotein lipase; and phosphoric diester hydrolases including phosphlipase C, phospholipase D, phosphoinositide phospholipase C, glycosylphosphatidylinositol phospholipase D, and N-acetylphosphatidylethanolamine-hydrolysing phospholipase D) and glycosylases, including glycosidases, i.e. enzymes hydrolysing O- and S-glycosyl compounds, for example amylases (including alpha-amylase, beta-amylase, and isoamylase), cellulases, and mannanases.

Suitable lipases and cutinases include those of bacterial or fungal origin. Chemically modified or protein engineered mutants are included. Examples include lipase from *Thermomyces*, e.g., from *T. lanuginosus* (previously named *Humicola lanuginosa*) as described in EP 258 068 (and U.S. Pat. No. 4,810,414) and EP 305 216 (and U.S. Pat. Nos. 5,766,912; 5,874,558; 5,965,384; 7,517,668; 5,536,661 and 5,863,759), cutinase from *Humicola*, e.g. *H. insolens* as described in WO 96/13580, a *Pseudomonas* lipase, e.g., from *P. alcaligenes* or *P. pseudoalcaligenes* (EP 218 272, U.S. Pat. Nos. 5,766,912; 5,863,759; 5,874,558; 5,965,384; 7,517,668 and 5,536,661), *P. cepacia* (EP 331 376 and U.S. Pat. No. 5,290,694), *P. stutzeri* (GB 1,372,034), *P. fluorescens*, *Pseudomonas* sp. strain SD 705 (WO 95/06720, U.S. Pat. No. 5,827,718, WO 96/27002, and U.S. Pat. No. 5,942,431), *P. wisconsinensis* (WO 96/12012), a *Bacillus* lipase, e.g., from *B. subtilis* (Dartois et al., 1993, *Biochemica et Biophysica Acta*, 1131: 253-360), *B. stearothermophilus* (JP 64/744992) or *B. pumilus* (WO 91/16422 and U.S. Pat. No. 5,427,936). Other examples are lipase variants such as those described in WO 92/05249, WO 94/01541, EP 407 225, EP 260 105, WO 95/35381, WO 96/00292, WO 95/30744, WO 94/25578, WO 95/14783, WO 95/22615, WO 97/04079, WO 97/07202, WO 00/060063, WO2007/087508, WO 2009/109500 and U.S. Pat. Nos. 5,892,013; 5,869,438; 5,976,855; 6,020,180; 6,074,863; 5,658,871; 4,760,025; 5,155,033; 5,182,204; 5,185,258; 5,204,015; 5,244,791; 5,264,366; 5,310,675; 5,316,941; 5,346,823; 5,352,594; 5,371,008; 5,371,190; 5,411,873; 5,441,882; 5,472,855; 5,652,136; 5,700,676; 5,763,257; 5,801,038; 5,939,315; 5,955,340; 5,972,682; 6,465,235; and RE34,606. Preferred commercially available lipase enzymes include Lipolase™, Lipolase Ultra™, and Lipex™; Lecitase™, Lipolex™; Lipoclean™, Lipoprime™ (Novozymes A/S). Other commercially available lipases include Lumafast (Genencor Int Inc); Lipomax, M1 Lipase (Gist-Brocades/Genencor Int Inc), and *Bacillus* sp lipase from Solvay.

Suitable amylases ($\alpha$ and/or $\beta$) include those of bacterial or fungal origin. Chemically modified or protein engineered mutants are included. Amylases include, for example, $\alpha$-amylases obtained from *Bacillus*, e.g., a special strain of *Bacillus licheniformis*, described in more detail in GB 1,296,839. Examples of useful amylases are the variants described in WO 94/02597, WO 94/18314, WO 96/23873, WO 97/43424, U.S. Pat. Nos. 5,824,532; 5,849,549; 6,297,037; 6,093,562; 6,297,038; 6,867,031; and US Publication Nos. 2002/0098996; 2003/0064908; 2004/0253676; 2005/0059201; 2005/0250664; 2006/0035323; 2009/0280527; 2010/0099597; 2010/0099598; and 2011/0177990, especially the variants with substitutions in one or more of the following positions: 15, 23, 105, 106, 124, 128, 133, 154, 156, 181, 188, 190, 197, 202, 208, 209, 243, 264, 304, 305, 391, 408, and 444. Commercially available amylases are Duramyl™ Termamyl™, Fungamyl™, Natalase™ and BAN™ (Novozymes A/S), Rapidase™ and Purastar™ (from Genencor International Inc.).

Suitable cellulases include those of bacterial or fungal origin. Chemically modified or protein engineered mutants are included. Suitable cellulases include cellulases from the genera *Bacillus, Pseudomonas, Humicola, Fusarium, Thielavia, Acremonium*, e.g., the fungal cellulases produced from *Humicola insolens, Myceliophthora thermophila* and *Fusarium oxysporum* disclosed in U.S. Pat. Nos. 4,435,307; 5,648,263; 5,691,178; 5,776,757 and WO 89/09259. Especially suitable cellulases are the alkaline or neutral cellulases having color care benefits. Examples of such cellulases are cellulases described in EP 0 495 257, EP 0 531 372, WO 96/11262, WO 96/29397, WO 98/08940, U.S. Pat. Nos. 5,520,838; 5,443,750; 5,668,073; 5,948,672; 6,423,524; 5,919,691; 6,071,735; 6,001,639; 6,387,690; 6,855,531; 7,226,773; and US Publication Nos. 2001/0036910; 2003/0119167; 2003/0054539; 2005/0070003; 2008/0145912; and 2010/0107342. Other examples are cellulase variants such as those described in WO 94/07998, EP 0 531 315, WO 95/24471, WO 98/12307, PCT/DK98/00299, U.S. Pat. Nos. 5,457,046; 5,686,593; 5,763,254; 5,792,641; 6,114,296; 5,457,046; 5,912,157; 6,117,664; 7,993,898; 8,017,372; and US Publication Nos. 2003/0092097; 2005/0009166; 2008/0206836; 2009/0170747 and 2011/0250674. Commercially available cellulases include Celluzyme™, and Carezyme™ (Novozymes A/S), Clazinase™, and Puradax HA™ (Genencor International Inc.), and KAC-500(B)™ (Kao Corporation).

Peptidases/Proteases

The hydrolases of EC 3 which act on peptide bonds (peptidases/proteases) can include, but are not limited to aminopeptidases (including leucyl aminopeptidase, membrane alanyl aminopeptidase, cystinyl aminopeptidase, tripeptide aminopeptidase, prolyl aminopeptidase, arginyl aminopeptidase, glutamyl aminopeptidase, Xaa-Pro aminopeptidase, bacterial leucyl aminopeptidase, clostridial aminopeptidase, cytosol alanyl aminopeptidase, lysyl aminopeptidase, Xaa-Trp aminopeptidase, tryptophanyl aminopeptidase, methionyl aminopeptidase, D-stereospecific aminopeptidase, aminopeptidase Ey, aspartyl aminopeptidase, aminopeptidase I, PepB aminopeptidase, aminopeptidase S, beta-peptidyl aminopeptidase, and intermediate cleaving peptidase 55); dipeptidases (including Xaa-Arg dipeptidase. Xaa-methyl-His dipeptidase, Glu-Glu dipeptidase, Xaa-Pro dipeptidase, Met-Xaa dipeptidase, non-stereospecific dipeptidase, cytosol nonspecific dipeptidase, membrane dipeptidase, beta-Ala-His dipeptidase, dipeptidase E, and D-Ala-D-Ala dipeptidase); Dipeptidyl-peptidases and tripeptidyl-peptidases (including dipeptidyl-peptidase I, dipeptidyl-peptidase II, dipeptidyl-peptidase III, dipeptidyl-peptidase IV, dipeptidyl-dipeptidase, tripeptidyl-peptidase I, tripeptidyl-peptidase II, Xaa-Pro dipeptidyl-peptidase, and prolyl-tripeptidyl aminopeptidase); peptidyl-dipeptidases (including peptidyl-dipeptidase A, peptidyl-dipeptidase B, peptidyl-dipeptidase Dcp, and cyanophycinase); serine-type carboxypeptidases (including lysosomal Pro-Xaa carboxypeptidase, serine-type D-Ala-D-Ala carboxypeptidase, carboxypeptidase C, and carboxypeptidase D); metallocarboxypeptidases (including carboxypeptidase A, carboxypeptidase B, lysine carboxypeptidase, Gly-Xaa carboxypeptidase, alanine carboxypeptidase, muramoylpentapeptide carboxypeptidase, carboxypeptidase E, glutamate carboxypeptidase, carboxypeptidase M, muramoyltetrapeptide carboxypeptidase, zinc D-Ala-D-Ala carboxypeptidase, carboxypeptidase A2, membrane Pro-Xaa carboxypeptidase, tubulinyl-Tyr carboxypeptidase, carboxypeptidase T, carboxypeptidase Taq, carboxypeptidase U, glutamate carboxypeptidase II, metallocarboxypeptidase D, and angiotensin-converting enzyme 2); ccysteine-type carboxypeptidases, including cathepsin X; omega peptidases (including acylaminoacyl-peptidase, peptidyl-glycinamidase, pyroglutamyl-peptidase I, beta-aspartyl-peptidase, pyroglutamyl-peptidase II, N-formylmethionyl-peptidase, gamma-glutamyl hydrolase, gamma-D-glutamyl-meso-diaminopimelate peptidase I, and ubiquitinyl hydrolase 1); serine endopeptidases (including chymotrypsin, chymotrypsin C, metridin, trypsin, thrombin, coagulation factor Xa, plasmin, enteropeptidase, acrosin, alpha-Lytic endopeptidase, glutamyl endopeptidase, cathepsin G, coagulation factor VIIa, coagulation factor IXa, cucumisin, prolyl oligopeptidase, coagulation factor XIa, brachyuran, plasma kallikrein, tissue kallikrein, pancreatic elastase, leukocyte elastase, coagulation factor XIIa, chymase, complement subcomponent $\overline{C^{1r}}$, complement subcomponent $\overline{C^{1s}}$, classical-complement-pathway C3/C5 convertase, complement factor I, complement factor D, alternative-complement-pathway C3/C5 convertase, cerevisin, hypodermin C, lysyl endopeptidase, endopeptidase La, gamma-renin, venombin AB, leucyl endopeptidase, tryptase, scutelarin, kexin, subtilisin, oryzin, peptidase K, thermomycolin, thermitase, endopeptidase So, t-plasminogen activator, protein C (activated), pancreatic endopeptidase E, pancreatic elastase II, IgA-specific serine endopeptidase, u-plasminogen activator, venombin A, furin, myeloblastin, semenogelase, granzyme A, granzyme B, streptogrisin A, streptogrisin B, glutamyl endopeptidase II oligopeptidase B, limulus clotting factor $\overline{C}$, limulus clotting factor $\overline{B}$, limulus clotting enzyme, repressor LexA, signal peptidase I, togavirin, flavivirin, endopeptidase Clp, proprotein convertase 1, proprotein convertase 2, snake venom factor V activator, lactocepin, assembling, hepacivirin, spermosin, sedolisin, xanthomonalisin, C-terminal processing peptidase, physarolisin, mannan-binding lectin-associated serine protease-2, rhomboid protease, hepsin, peptidase Do, HtrA2 peptidase, matriptase, C5a peptidase, aqualysin 1, site-1 protease, pestivirus NS3 polyprotein peptidase, equine arterivirus serine peptidase, infectious pancreatic necrosis birnavirus Vp4 peptidase, SpoIVB peptidase, stratum corneum chymotryptic enzyme, kallikrein 8, kallikrein 13, and oviductin); cysteine endopeptidases(including cathepsin B, papain, ficain, chymopapain, asclepain, clostripain, streptopain, actinidain, cathepsin L, cathepsin H, cathepsin T, glycyl endopeptidase, cancer procoagulant, cathepsin S, picornain 3C, picornain 2A, caricain, ananain, stem bromelain, fruit bromelain, legumain, histolysain, caspase-1, gingipain R, cathepsin K, adenain, bleomycin hydrolase, cathepsin F, cathepsin V, cathepsin 0, nuclear-inclusion-a endopeptidase, helper-component proteinase, L-peptidase, gingipain K, staphopain, separase, V-cath endopeptidase, cruzipain, calpain-1, calpain-2, calpain-3, caspase-2, caspase-3, caspase-4, caspase-5, caspase-6, caspase-7, caspase-8, caspase-9, caspase-10, caspase-11, peptidase 1 (mite), calicivirin, zingipain, Ulp1 peptidase, SARS coronavirus main proteinase, sortase A, and sortase B); aspartic endopeptidases (including pepsin A, pepsin B, gastricsin, chymosin, cathepsin D, nepenthesin, renin, HIV-1 retropepsin, Pro-opiomelanocortin converting enzyme, aspergillopepsin I, aspergillopepsin II, penicillopepsin, rhizopuspepsin, endothiapepsin, mucorpepsin, candidapepsin, saccharopepsin, rhodotorulapepsin, acrocylindropepsin, polyporopepsin, pycnoporopepsin, scytalidopepsin A, scytalidopepsin B, cathepsin E, barrierpepsin, signal peptidase II, plasmepsin I, plasmepsin II, phytepsin, yapsin 1, thermopsin, prepilin peptidase, nodavirus endopeptidase, memapsin 1, memapsin 2, HIV-2 retropepsin, plasminogen activator Pla, omptin, human endogenous retrovirus K endopeptidase, and HycI peptidase); metalloendopeptidases (including atrolysin A, microbial collagenase, leucolysin, interstitial collagenase, neprilysin, envelysin, IgA-specific metalloendopeptidase, procollagen N-endopeptidase, thimet oligopeptidase, neurolysin, stromelysin 1, meprin A, procollagen C-endopeptidase, peptidyl-Lys metalloendopeptidase, astacin, stromelysin 2, matrilysin, gelatinase A, vibriolysin, pseudolysin, thermolysin, bacillolysin, aureolysin, coccolysin, mycolysin, β-lytic metalloendopeptidase, peptidyl-Asp metalloendopeptidase, neutrophil collagenase, gelatinase B, leishmanolysin, saccharolysin, gametolysin, deuterolysin, serralysin, atrolysin B, atrolysin C, atroxase, atrolysin E, atrolysin F, adamalysin, horrilysin, ruberlysin, bothropasin, bothrolysin, ophiolysin, trimerelysin I, trimerelysin II, mucrolysin, pitrilysin, insulysin, O-sialoglycoprotein endopeptidase, russellysin, mitochondrial intermediate peptidase, dactylysin, nardilysin, magnolysin, meprin B, mitochondrial processing peptidase, macrophage elastase, choriolysin L, choriolysin H, tentoxilysin, bontoxilysin, oligopeptidase A, endothelin-converting enzyme, fibrolase, jararhagin, fragilysin, lysostaphin, flavastacin, snapalysin, gpr endopeptidase, pappalysin-1, membrane-type matrix metalloproteinase-1, ADAM10 endopeptidase, ADAMTS-4 endopeptidase, anthrax lethal factor endopeptidase, Ste24 endopeptidase, S2P endopeptidase, ADAM 17 endopeptidase, and ADAMTS13 endopeptidase); and threonine endopeptidases (including proteasome endopeptidase complex and HslU-HslV peptidase).

Suitable proteases include those of animal, vegetable or microbial origin. Microbial origin is preferred. Chemically modified or protein engineered mutants are included. The protease may be a serine protease or a metalloprotease, preferably an alkaline microbial protease or a trypsin-like protease. Examples of alkaline proteases are subtilisins, especially those derived from *Bacillus*, e.g., subtilisin Novo, subtilisin Carlsberg, subtilisin 309, subtilisin 147 and subtilisin 168 (described in WO 89/06279, U.S. Pat. Nos. 6,506,589; 6,808,913; 6,835,821; and US Publication Nos. 2003/0148495; 2003/0175933; 2003/0186378 and 2005/0003986). Examples of trypsin-like proteases are trypsin (e.g., of porcine or bovine origin) and the *Fusarium* protease described in WO 89/06270, WO 94/25583, and U.S. Pat. Nos. 5,288,627 and 5,693,520. Examples of useful proteases are the variants described in WO 92/19729, WO 98/20115, WO 98/20116, WO 98/34946, and U.S. Pat. Nos. 5,858,757; 6,300,116; 7,098,017; 6,159,731; and US Publication No. 2002/0102702, especially the variants with substitutions in one or more of the following positions: 27, 36, 57, 76, 87, 97, 101, 104, 120, 123, 167, 170, 194, 206, 218, 222, 224, 235, and 274. Preferred commercially available protease enzymes include Alcalase™, Savinase™, Primase™, Duralase™, Esperase™, and Kannase™ (Novozymes A/S), Maxatase™, Maxacal™, Maxapem™, Properase™, Purafect™ Purafect OxP™, FN2™, and FN3™ (Genencor International Inc.)

Enzymes for use in laundry and dishwashing applications can include one or more of protease, amylase, lipase, dehydrogenase, transaminase, kinase, cellulase, mannanase, peptidase, decarboxylase, isomerase, mutase, synthetase, synthase, and oxido-reductase enzymes, including oxido-reductase enzymes that catalyze the formation of bleaching agents.

It is contemplated that an enzyme for use in a powder described herein can come from any suitable source or combination of sources, for example bacterial, fungal, plant, or animal sources. In one type of embodiment, a mixture of two or more enzymes will come from at least two different types of sources. For example, a mixture of protease and lipase can come from a bacterial (protease) and fungal (lipase) sources.

Optionally, an enzyme for use herein, including but not limited to any enzyme class or member described herein, is one which works in alkaline pH conditions, e.g. for use in detergent applications including laundry detergent and/or dish detergent, e.g. a pH in a range of about 8 to about 11. Optionally, an enzyme for use herein, including but not limited to any enzyme class or member described herein, is one which works in a temperature in a range of about 5° C. to about 45° C.

Oils other than fragrances can include flavorants and colorants.

In one class of embodiments the active agent comprises a flavor or combination of flavors. Suitable flavors include but are not limited to, spearmint oil, cinnamon oil, oil of wintergreen (methylsalicylate), peppermint oils, and synthetic and natural fruit flavors, including citrus oils.

In some embodiments, the active agent may be a colorant or combination of colorants. Examples of suitable colorants include food colorings, caramel, paprika, cinnamon, and saffron. Other examples of suitable colorants can be found in U.S. Pat. No. 5,002,789, hereby incorporated by reference in its entirety.

Another class of embodiments include one or more odor absorbers as active agents. Suitable odor absorbers for use as active agents according to the disclosure include, but are not limited to, zeolites, and complex zinc salts of ricinoleic acid. The odor absorbing active agent can also comprise fixatives that are well known in the art as largely odor-neutral fragrances, including but not limited to extracts of labdanum, styrax, and derivatives of abietic acid.

Another class of embodiments include one or more fragrances as active agents. As used herein, the term fragrance refers to any applicable material that is sufficiently volatile to produce a scent. Embodiments including fragrances as active agents can include fragrances that are scents pleasurable to humans, or alternatively fragrances that are scents repellant to humans, animals, and/or insects. Suitable fragrances include, but are not limited to, fruits including, but not limited to, lemon, apple, cherry, grape, pear, pineapple, orange, strawberry, raspberry, musk and flower scents including, but not limited to, lavender-like, rose-like, iris-like and carnation-like. Optionally the fragrance is one which is not also a flavoring. Other fragrances include herbal scents including, but not limited to, rosemary, thyme, and sage; and woodland scents derived from pine, spruce and other forest smells. Fragrances may also be derived from various oils, including, but not limited to, essential oils, or from plant materials including, but not limited to, peppermint, spearmint and the like. Suitable fragrant oils can be found in U.S. Pat. No. 6,458,754, hereby incorporated by reference in its entirety. Suitable fragrant oils include, but are not limited to, 4-(2,2,6-trimethylcyclohex-1-enyl)-2-en-4-one, acetaldehyde phenyletheyl propyl acetal, 2,6,10-trimethyl-9-undecenal, hexanoic acid 2-propenyl ester, 1-octen-3-ol, trans-anethole, iso buthyl (z)-2-methyl-2-butenoate, anisaldehyde diethyl acetal, 3-methyl-5-propyl-cyclohezen-1-one, 2,4-dimethyl-3-cyclohexene-1-carbaldehyde, trans-4-decenal, decanal, 2-pentylcyclopentanone, ethyl anthranilate, eugenol, 3-(3-isopropylphenyl)butanoal, methyl 2-octynoate, isoeugenol, cis-3-hexenyl methyl carbonate, linalool, methyl-2-nonynonate, benzoic acid 2-hydroxymethyl ester, nonal, octanal, 2-nonennitrile, 4-nonanolide, 9-decen-1-ol, and 10-undecen-1-al. Applicable fragrances can also be found in U.S. Pat. Nos. 4,534,981, 5,112,688, 5,145,842, 6,844,302 and Perfumes Cosmetics and Soaps, Second Edition, edited by W. A. Poucher, 1959, all hereby incorporated by reference in their entireties. These fragrances include acacia, cassie, chypre, cyclamen, fern, gardenia, hawthorn, heliotrope, honeysuckle, hyacinth, jasmine, lilac, lily, magnolia, mimosa, narcissus, freshly-cut hay, orange blossom, orchids, reseda, sweet pea, trefle, tuberose, vanilla, violet, wallflower, and the like.

Applicable insect repellant fragrances include one or more of dichlorvos, pyrethrin, allethrin, naled and/or fenthion pesticides disclosed in U.S. Pat. No. 4,664,064, incorporated herein by reference in its entirety. Suitable insect repellants are citronellal (3,7-dimethyl-6-octanal), N,N-diethyl-3-methylbenzamide (DEET), vanillin, and the volatile oils extracted from turmeric (*Curcuma longa*), kaffir lime (*Citrus hystrix*), citronella grass (*Cymbopogon winterianus*) and hairy basil (*Ocimum americanum*). Moreover, applicable insect repellants can be mixtures of insect repellants.

In one class of embodiments, the active agents according to the disclosure can comprise one or more pesticides. Suitable pesticides may include, but are not limited to, insecticides, herbicides, acaricides, fungicides, and larvacides.

Another class of embodiments include one or more fertilizers as active agents. As used herein, the term fertilizer applies to any applicable material that releases one or more of nitrogen, phosphorus, potassium, calcium, magnesium, sulfur, boron, chlorine, copper, iron, manganese, molybdenum, or zinc. Suitable fertilizers include, but are not limited to zeolites. For example, clinoptilolite is a zeolite that releases potassium and can also release nitrogen when preloaded with ammonium.

One class of embodiments comprise acid catalysts as active agents. As used herein, the term acid catalysts refers to any species that serves as a proton source, thereby facilitating a chemical reaction. In one type of embodiment, the acid catalyst will be a non-oxidizing organic acid. A suitable organic acid is para-toluenesulfonic acid. In some embodiments, active agents that are acid catalysts will facilitate reactions including, but not limited to, acetalization, esterification or transesterification. Additional acid catalyzed reactions are well known in the art.

In one class of embodiments, active agents will include metal catalysts. These catalysts mediate reactions including, but not limited to, oxidation or reduction, hydrogenation, carbonylation, C—H bond activation, and bleaching. Suitable metals for use as metal catalysts include, but are not limited to the VIIIA and IB transition metals, for example, iron, cobalt, nickel, copper, platinum, rhodium, ruthenium, silver, osmium, gold and iridium. The metal that mediates catalysis can be of any suitable oxidation state.

In alternative embodiments, the active agent may optionally be an ion scavenger. Suitable ion scavengers include, but are not limited to, zeolites. Optionally, zeolites can be added to water-soluble packets comprising laundry detergents or dish washing detergents enclosed within, as a water softener.

Inorganic and organic bleaches are suitable cleaning active agents for use herein. Inorganic bleaches include perhydrate salts including, but not limited to, perborate, percarbonate, perphosphate, persulfate and persilicate salts. The inorganic perhydrate salts are normally the alkali metal salts. Alkali metal percarbonates, particularly sodium percarbonate are suitable perhydrates for use herein. Organic bleaches can include organic peroxyacids including diacyl and tetraacylperoxides, especially, but not limited to, diperoxydodecanedioc acid, diperoxytetradecanedioc acid, and diperoxyhexadecanedioc acid. Dibenzoyl peroxide is a suitable organic peroxyacid according to the disclosure. Other organic bleaches include the peroxy acids, particular examples being the alkylperoxy acids and the arylperoxy acids.

In one class of embodiments, active agents can comprise bleach activators, including organic peracid precursors that enhance the bleaching action in the course of cleaning at temperatures of 60° C. and below. Bleach activators suitable for use herein include compounds which, under perhydrolysis conditions, give aliphatic peroxoycarboxylic acids having from 1 to 10 carbon atoms, or from 2 to 4 carbon atoms, and/or optionally substituted perbenzoic acid. Suitable substances bear O-acyl and/or N-acyl groups of the number of carbon atoms specified and/or optionally substituted benzoyl groups. Suitable substances include, but are not limited to, polyacylated alkylenediamines, in particular tetraacetylethylenediamine (TAED), acylated triazine derivatives, in particular 1,5-diacetyl-2,4-dioxohexahydro-1,3,5-triazine (DADHT), acylated glycolurils, in particular tetraacetylglycoluril (TAGU), N-acylimides, in particular N-nonanoylsuccinimide (NOSI), acylated phenolsulfonates, in particular n-nonanoyl- or isononanoyloxybenzenesulfonate (n- or iso-NOBS), carboxylic anhydrides, in particular phthalic anhydride, acylated polyhydric alcohols, in particular triacetin, ethylene glycol diacetate and 2,5-diacetoxy-2,5-dihydrofuran and also triethylacetyl citrate (TEAC).

In embodiments that comprise fabric softeners as active agents, various through-the-wash fabric softeners, especially the impalpable smectite clays of U.S. Pat. No. 4,062,647, incorporated herein by reference in its entirety, as well as other softener clays known in the art, can optionally be used to provide fabric softener benefits concurrently with fabric cleaning. Clay softeners can be used in combination with amine and cationic softeners as disclosed, for example, in U.S. Pat. Nos. 4,375,416 and 4,291,071, incorporated herein by reference in their entireties.

Active agents may be solids or liquids. Active agents that are solids can have an average particle size of at least about 0.01 μm, or a size in a range of about 0.01 μm to about 2 mm, for example. Liquid active agents may be mixed with a carrier powder directly or microencapsulated. In embodiments that comprise a carrier powder, the average particle size of the carrier powder can be at least about 0.01 μm, or in a range of about 0.01 μm to about 2 mm, for example. In embodiments that comprise the microencapsulation of the active agent, the particle size of the solid active agent or carrier powder, that has active agent adsorbed, need only be sufficiently small enough to enable it to be microencapsulated. In coating powders according to the disclosure, the active agent can be present in the coating powder in an amount of at least about 1 wt %, or in a range of about 1 wt % to about 99 wt %.

In one class of embodiments the active agent is encapsulated, allowing for the controlled release of the active agent. Suitable microcapsules can include or be made from one or more of melamine formaldehyde, polyurethane, urea formaldehyde, chitosan, polymethyl methacrylate, polystyrene, polysulfone, poly tetrahydrofuran, gelatin, gum arabic, starch, polyvinyl pyrrolidone, carboxymethylcellulose, hydroxyethylcellulose, methylcellulose, arabinogalactan, polyvinyl alcohol, polyacrylic acid, ethylcellulose, polyethylene, polymethacrylate, polyamide, poly (ethylenevinyl acetate), cellulose nitrate, silicones, poly(lactideco-glycolide), paraffin, carnauba, spermaceti, beeswax, stearic acid, stearyl alcohol, glyceryl stearates, shellac, cellulose acetate phthalate, zein, and combinations thereof. In one type of embodiment, the microcapsule is characterized by a mean particle size of at least about 0.1 micron, or in a range of about 0.1 micron to about 200 microns, for example. In alternate embodiments, the microcapsules can form agglomerates of individual particles, for example wherein the individual particles have a mean particle size of at least about 0.1 micron, or in a range of about 0.1 micron to about 200 microns.

Examples of microcapsules that may form agglomerates include, but are not limited to, melamine formaldehyde, polyurethane, urea formaldehyde, chitosan, polymethyl methacrylate, polystyrene, polysulfone, polytetrahydrofuran, gelatin, gum arabic, starch, polyvinyl pyrrolidone, carboxymethylcellulose, hydroxyethylcellulose, methylcellulose, arabinogalactan, polyvinyl alcohol, polyacrylic acid, ethylcellulose, polyethylene, polymethacrylate, polyamide, poly(ethylenevinyl acetate), cellulose nitrate, silicones, poly (lactidoco-glycolide), paraffin, carnauba, spermaceti, beeswax, stearic acid, stearyl alcohol, glyceryl stearates, shellac, cellulose acetate phthalate, and zein.

Mechanisms for the controlled release of the active agent from the microcapsule can include one or more of mechanical rupture, dissolution, diffusion release, ablation release, biodegradation, melting, and pH-triggered release. In embodiments wherein a mechanical rupture release mechanism is employed, the mean particle size of the microcapsule particle or agglomerate can be greater than the mean particle size of the powdered lubricant, for example. Microcapsules suitable for use in a mechanical rupture mechanism can include one or more of the group including, but not limited to, melamine formaldehyde, polyurethane, urea formaldehyde, polymethyl methacrylate, and polytetrahydrofuran.

Suitable microcapsules for use in embodiments that include a dissolution release mechanism can include one or more of the group including, but not limited to, gelatin, gum arabic, starch, malodextrins, polyvinylpyrrolidone, carboxymethylcellulose, hydroxyethylcellulose, methylcellulose, arabinogalactan, polyvinyl alcohol, and polyacrylic acid.

Suitable microcapsules for use in embodiments that include a diffusion release mechanism can include one or more of the group including, but not limited to, aminoplast capsules with disulfide linkages and melamine formaldehyde microcapsules. Examples of aminoplast capsules with disulfide linkages can be found in U.S. Pat. No. 6,485,736, herein incorporated by reference in its entirety.

Suitable microcapsules for use in embodiments that include an ablation release mechanism can include one or more of the group including, but not limited to, ethylcellulose, polyethylene, polymethacrylate, polyamide, poly (ethylenevinyl acetate), cellulose nitrate, silicones, and poly (lactideco-glycolide).

Suitable microcapsules for use in embodiments that include a biodegradation release mechanism can include one or more of the group including, but not limited to, mono- and co-polyesters of the lactic, glycolic, and β-hydroxybutyric acids, as well as δ-valerolactone and ε-caprolactones. Examples of microcapsules that utilize a biodegradation release mechanism can be found in U.S. Pat. No. 5,648,096, herein incorporated by reference in its entirety.

Suitable microcapsules for use in embodiments that include a melt release mechanism can include one or more of the group including, but not limited to, polystyrene, polysulfone paraffin, carnauba, spermaceti, beeswax, stearic acid, stearyl alcohol, and glyceryl stearates.

Suitable microcapsules for use in embodiments that include a pH-triggered release mechanism can include one or more of the group including, but not limited to, shellac, cellulose acetate phthalate, zein, and chitosan. Polymers with pH-triggered dissolution are described in U.S. Patent Application Publication 2010/0105821-A1, herein incorporated by reference in its entirety.

The powdered lubricant can be prepared as a master batch. The coating powder composition can be prepared by combining a portion of the powdered lubricant master batch with the active agent to form a daughter batch of coating powder. This process can be continuous or intermittent. A continuous feed of active agent can be comprised of multiple active agent compositions added sequentially, for example, to a feed of powdered lubricant.

The coating powder composition can be applied to the film or packet by any suitable means. In a one embodiment, one or more stationary powder spray guns are used to direct the powder stream towards the packets, from one or more than one direction, while the packets are transported through the coating zone by means of a belt conveyor. In an alternative embodiment, the pouch is conveyed through a suspension of the coating powder in air. In yet another alternative embodiment the packets are tumble-mixed with the coating powder in a trough-like apparatus. In another embodiment, which can be combined with any other embodiment, electrostatic forces are employed to enhance the attraction between the powder and the packet. This type of process is typically based on negatively charging the powder particles and directing these charged particles to the grounded packets. In other alternative embodiments, the powder is applied to the packet by a secondary transferring tool including, but not limited to rotating brushes which are in contact with the powder or by powdered gloves which can transfer the powder from a container to the packet. In yet another embodiment the powder is applied by dissolving or suspending the powder in a non-aqueous solvent which is then atomized and sprayed onto the packet.

In one class of embodiments, the powder is applied to the packet in an accurate dose. This class of embodiments utilizes closed-system dry lubricant application machinery, such as PekuTECH's powder applicator PM 700 D. In this process the coating powder, optionally batch-wise or continuously, is fed to a feed trough of application machinery. The packets are transferred from the output belt of a standard rotary drum pouch machine onto a conveyor belt of the powder application machine, wherein a controlled dosage of the functionalized coating powder is applied to the packet. The packet is thereafter conveyed to a suitable secondary packaging process.

In some embodiments, in use the microcapsule will be mechanically ruptured thereby releasing the active agent. Suitable active agents to be released via mechanical rupture include, but are not limited to, fragrances, oils, enzymes, odor absorbers, and activators. In one embodiment, a fragrance will be microencapsulated, providing a controlled and efficient delivery mechanism. In this embodiment, the packet will retain the fragrance until the point of use, upon which handling by the consumer will mechanically rupture some of the microcapsules, releasing the fragrance. This embodiment is advantageous in mitigating the inherent "malodor" of the water-soluble film itself, or from a component of the material packaged in the water-soluble film, in the presence of the consumer.

In alternative embodiments, in use the active agent will be released from the microcapsule by dissolution of the microcapsule. Suitable active agents to be released upon microcapsule dissolution include, but are not limited to, flavors, colorants, bleaches, bleach components, enzymes, activators, acid catalysts, metal catalysts, and ion scavengers. In one embodiment, the water-soluble packet may be comprised of edible water-soluble film. The microencapsulation of a flavor active or other active agent, for example, allows for the use of ingredients that are not or might not be compatible with the water-soluble film. For example, an ingredient may cause crosslinking or other reactions that would adversely affect the film solubility. The encapsulation of the flavor therefore allows for the inclusion of the ingredient. In other embodiments the encapsulation of both a flavor and a color would allow for an enhanced flavor experience and an aesthetically pleasing visual appearance. In one type embodiment, an edible, hot water-soluble film may contain a plain, uncolored oatmeal composition. In these embodiments, upon dissolution of the microcapsule, the color and flavor can be imparted to the plain, uncolored oatmeal composition, for example, red and strawberry, blue and blueberry, or brown and maple. Applying the color/flavor microcapsules via the coating powder also advantageously streamlines the manufacturing process and makes for a more flexible supply management, allowing the manufacturer to mass-package a single type of composition, i.e., plain oatmeal, in a water-soluble film and add the color/flavor at a later time.

In one class of embodiments, the active agent will be released from the microcapsule by diffusion. Suitable active agents for use with a diffusion release mechanism include, but are not limited to, pesticides and fragrances. In one embodiment the water-soluble packet can contain a laundry composition and the coating powder can comprise a perfume. In this embodiment, the fragrance will slowly diffuse from the microcapsule during storage, advantageous in mitigating the inherent "malodor" of the water-soluble film itself, or from a component of the material packaged in the water-soluble film, in the presence of the consumer, and will also release the remaining fragrance on the laundry substrates during the wash cycle.

Embodiments may comprise an ablation or erosion mechanism for the release of active agents from the microcapsules. Suitable active agents to be released upon ablation of the microcapsules include, but are not limited to, bleaches, bleach components, and enzymes. In one embodiment, the composition enclosed in the water-soluble packet may comprise a percarbonate bleaching agent and the microencapsulated active agent may comprise the bleach activator TAED. In this embodiment, upon ablation, the microcapsule will release the TAED, allowing it to react with the percarbonate, forming an activated bleach.

In alternative embodiments, the active agent will be released upon biodegradation of the microcapsule. Suitable active agents for use in a biodegradable microcapsule include, but are not limited to, pesticides and fertilizers. In one embodiment, a water-soluble packet may contain a fertilizer or other lawn-care composition. The packet can be dusted with a biodegradable microcapsule containing a pesticide. After application, the microcapsule will biodegrade, releasing the pesticide. In this embodiment, the consumer can safely use a single dose of pesticide without coming in direct contact with the pesticide.

In some embodiments, the microcapsules will release the active agent upon melting. Suitable active agents to be released when the microcapsule melts include, but are not limited to, fabric softeners. In one embodiment, the active agent may comprise a fabric softener. The fabric softener would be delivered to a laundry substrate via a water-soluble packet comprising a detergent enclosed within the packet. During the wash cycle, the microcapsules would disperse onto the laundry substrate, however the fabric softener would not be released until the substrate was heated to a temperature not encountered in the clothes washer (e.g. greater than 40° C. or greater than 50° C., or greater than 55° C., or greater than 60° C.) but only encountered in the dryer.

In another type of embodiment, the microcapsule will release the active agent upon dry brittle failure. For example, in one embodiment the active agent can include a fabric softener. The fabric softener would be delivered to a laundry substrate via a water-soluble packet comprising a detergent enclosed within the packet. During the wash cycle, the microcapsules would disperse onto the laundry substrate, however the fabric softener would not be released until the capsules were dried sufficiently to become brittle and crack, thus releasing their contents. For example, the microcapsules can be designed to become brittle at a critical relative humidity significantly below standard household conditions, e.g. ≤40%, or <40%, or ≤35%, or <35%, or ≤30%, or <30%, or ≤25%, or <25%.

Embodiments may comprise pH triggered release of the active agent from the microcapsule. Suitable active agents for a pH triggered release may include, but are not limited to, fragrances, oils, enzymes, odor absorbers, and activators. In one embodiment the composition enclosed in the water-soluble packet may comprise a laundry detergent composition and a first enzyme that is unstable in the presence of a protease, and the active agent may comprise a protease enzyme. The packet, when placed in a washing machine would dissolve, releasing the detergent composition and the first enzyme. When the washing water pH is adjusted to appropriate levels the microcapsule would release the protease, thereby allowing a full dose of a first enzyme and a protease to reach a stained substrate. In an alternative embodiment, a protease may be enclosed within the packet and the active agent may comprise a second enzyme encapsulated in a microcapsule, wherein the protease would be released first and upon reaching the appropriate pH, the second enzyme would be released. In yet another embodiment, the composition enclosed within the packet may comprise a first enzyme and the active agent may comprise a second enzyme, wherein both the first and second enzyme are unstable in the presence of the other. In another embodiment, the packet can contain an automatic dishwasher detergent and the microcapsule can contain a rinse aid, wherein the microcapsule is insoluble in highly alkaline solutions (e.g., pH greater than 9.3, or greater than 10) and soluble in neutral to mildly alkaline conditions, such that the rinse aid is not released during the wash cycle but only in the rinse cycle.

The foregoing description is given for clearness of understanding only, and no unnecessary limitations should be understood therefrom, as modifications within the scope of the invention may be apparent to those having ordinary skill in the art.

The water-soluble films in accordance with the disclosure can be better understood in light of the following example, which is merely intended to illustrate the water-soluble films and water-soluble packets and are not meant to limit the scope thereof in any way.

Specific contemplated aspects of the disclosure herein are described in the following numbered paragraphs.

1. A water-soluble packet, comprising:
   a water-soluble film in the form of a packet and coated by
      a powder, the powder comprising a mixture of
      a powdered lubricant; and
      an active agent wherein the active agent is not a fragrance.

2. A water-soluble packet, comprising:
   a water-soluble film in the form of a packet and coated by
      a powder, the powder comprising
      a powdered lubricant; and
      an active agent which comprises a microencapsulated fragrance.

3. The water-soluble packet of paragraph 1, wherein the active agent is microencapsulated.

4. The water-soluble packet according to any one of the preceding paragraphs, wherein the powdered lubricant is selected from the group consisting of starches, modified starches, silicas, siloxanes, calcium carbonate, magnesium carbonate, clay, talc, silicic acid, kaolin, gypsum, zeolites, cylclodextrins, calcium stearate, zinc stearate, alumina, magnesium stearate, alumina, zinc oxide and combinations thereof.

5. The water-soluble packet according to any one of the preceding paragraphs, wherein the active agent is selected from the group consisting of enzymes, oils, flavors, colorants, odor absorbers, fragrances, pesticides, fertilizers, activators, acid catalysts, metal catalysts, ion scavengers, bleaches, bleach components, fabric softeners or combinations thereof.

6. The water-soluble packet of paragraph 2 or paragraph 3, wherein the microcapsule is characterized by one or more of the following release mechanisms: mechanical rupture, dissolution, diffusion, ablation, biodegradation, melt, or a pH triggered release mechanism.

7. The water-soluble packet of any one of the preceding paragraphs, wherein the powdered lubricant is characterized by a mean particle size in a range of about 1 μm to about 100 μm.

8. The water-soluble packet according to any one of paragraphs 2-5, wherein said microcapsule is selected from one or more of: melamine formaldehyde, polyurethane, urea formaldehyde, chitosan, poly methyl methacrylate, polystyrene, polysulfone, poly tetrahydrofuran, gelatin, gum arabic, starch, polyvinylpyrrolidone, carboxymethylcellulose, hydroxyethylcellulose, methylcellulose, arabinogalactan, polyvinyl alcohol, polyacrylic acid, ethylcellulose, polyethylene, polymethacrylate, polyamide, poly (ethylenevinyl acetate), cellulose nitrate, silicones, poly(lactideco-glycolide), paraffin, carnauba, spermaceti, beeswax, stearic acid, stearyl alcohol, glyceryl stearates, shellac, cellulose acetate phthalate, and zein.

9. The water-soluble packet according to any one of the preceding paragraphs, wherein the microcapsule is characterized by a mean particle size in a range of about 0.1 μm to about 200 μm.

10. The water-soluble packet according to any one of paragraphs 2-15, wherein the mean particle size of the microcapsule is greater than the mean particle size of the powdered lubricant, wherein the microcapsule is selected from one or more of the group consisting of melamine formaldehyde, polyurethane, urea formaldehyde, chitosan, polymethyl methacrylate, polystyrene, polysulfone, poly tetrahydrofuran, gelatin, gum arabic, starch, polyvinyl pyrrolidone, carboxymethylcellulose, hydroxyethylcellulose, methylcellulose, arabinogalactan, polyvinyl alcohol, polyacrylic acid, ethylcellulose, polyethylene, polymethacrylate, polyamide, poly (ethylenevinyl acetate), cellulose nitrate, silicones, poly(lactideco-glycolide), paraffin, carnauba, spermaceti, beeswax, stearic acid, stearyl alcohol, glyceryl stearates, shellac, cellulose acetate phthalate, and zein.

11. The water-soluble packet according to any one of paragraphs 2-15, wherein microcapsule agglomerates are formed and the mean microcapsule agglomerate size is greater than the mean particle size of the powdered lubricant, wherein the microcapsule is selected from one or more of the group consisting of melamine formaldehyde, polyurethane, urea formaldehyde, chitosan, polymethyl methacrylate, polystyrene, polysulfone, polytetrahydrofuran, gelatin, gum arabic, starch, polyvinyl pyrrolidone, carboxymethylcellulose, hydroxyethylcellulose, methylcellulose, arabinogalactan, polyvinyl alcohol, polyacrylic acid, ethylcellulose, polyethylene, polymethacrylate, polyamide, poly(ethylenevinyl acetate), cellulose nitrate, silicones, poly(lactidoco-glycolide), paraffin, carnauba, spermaceti, beeswax, stearic acid, stearyl alcohol, glyceryl stearates, shellac, cellulose acetate phthalate, or zein.

12. The water-soluble packet according to any one of the preceding paragraphs, wherein the powder comprises about 1 wt % to about 99 wt % active agent.

13. The water-soluble packet according to any one of the preceding paragraphs, wherein the powder comprises about 1 wt % to about 99 wt % powdered lubricant.

14. The water-soluble packet according to any one of the preceding paragraphs, wherein the powder is present in an amount in a range of about 0.01 mg/cm$^2$ to about 10 mg/cm$^2$.

15. The water-soluble packet according to any one of the preceding paragraphs, wherein the water-soluble film comprises a material selected from the group consisting polyvinyl alcohol, modified polyvinyl alcohols, polyacrylates, water-soluble acrylate copolymers, methylcellulose, carboxymethylcellulose, dextrin, ethylcellulose, hydroxyethylcelleulose, hydroxypropyl methylcellulose, malodextrin, polymethacrylates, polyvinyl alcohol copolymers, hydroxypropyl methyl cellulose, polyvinyl pyrrolidone, polyalkylene oxides, acrylamide, acrylic acid, and combinations thereof.

16. The water-soluble packet according to any one of the preceding paragraphs, further comprising a solid, liquid, or gel composition enclosed within the water-soluble film.

17. The water-soluble packet according to paragraph 16, wherein the enclosed composition comprises laundry detergents, bleach and laundry additives, fabric care, dishwashing, hard surface cleaning, beauty care, skin care, other personal care, or food product compositions.

18. The water-soluble packet according to paragraph 16, wherein the active agent is capable of a chemical reaction with a component of the composition enclosed in the water-soluble film.

19. The water-soluble packet according to paragraph 18, wherein the active agent is capable of a chemical reaction with a component of the composition enclosed in the water-soluble film in an aqueous solution.

20. The water-soluble packet according to paragraph 16, wherein either the active agent is unstable in the presence of a component of the composition enclosed within the water-soluble film, or a component of the composition enclosed within the water-soluble film is unstable in the presence of the active agent, or both the active agent and a component of the composition enclosed within the water-soluble film are unstable in the presence of each other.

21. The water-soluble packet according to paragraph 19, wherein
the composition enclosed in the water-soluble film comprises a percarbonate; and
the active agent comprises tetraacytylethylenediamine (TAED).

22. A method of providing a water-soluble packet with additional functionality, comprising:
coating a water-soluble packet with a powder comprising a powdered lubricant; and
an active agent wherein the active agent is not a fragrance.

23. A method of providing a water-soluble packet with additional functionality, comprising:
coating a water-soluble packet with a powder comprising a powdered lubricant; and
an active agent which comprises a microencapsulated fragrance.

24. The method according to paragraph 22, wherein the active agent is microencapsulated.

25. The method according to paragraph 22, 23, or 24, wherein the water-soluble packet further comprises a solid, liquid, or gel composition enclosed within the water-soluble film.

26. The method according to any one of paragraphs 22-24, wherein the powder coating is present in an amount in a range of about 0.01 mg/cm$^2$ to about 10 mg/cm$^2$.

27. The method according to any one paragraphs 22-26, wherein the powdered lubricant is selected from the group consisting of starches, modified starches, silicas, siloxanes, calcium carbonate, magnesium carbonate, clay, talc, silicic acid, kaolin, gypsum, zeolites, cyclodextrins, calcium stearate, zinc stearate, magnesium stearate, alumina, zinc oxide and combinations thereof.

28. The method according to any one of paragraphs 22-27, wherein said active agent is selected from the group consisting of enzymes, oils, flavors, colorants, odor absorbers, pesticides, fertilizers, activators, acid catalysts, metal catalysts, ion scavengers, bleaches, bleach components, fabric softeners and combinations thereof.

29. The method according to any one of paragraphs 22-28, further comprising preparing the coating powder by a process comprising:
providing a master batch of a first powder comprising a first powdered lubricant; and
mixing the active agent with a portion of the master batch to form a daughter batch of coating powder.

30. The method according to paragraph 29, wherein a continuous feed of active agent is mixed with a continuous feed of the master batch to form the coating powder.

31. The method according to any one of paragraphs 22-30, wherein the process of applying the coating powder to the water-soluble film comprises sprinkling, brushing, dusting, or spraying.

32. A water-soluble film coated by a powder, the powder comprising a mixture of a powdered lubricant and an active agent, wherein the active agent is not a fragrance.

33. A water-soluble film coated by a powder, the powder comprising a powdered lubricant and an active agent which comprises a microencapsulated fragrance.

EXAMPLES

Effect of Microencapsulated Fragrances on Pouch Malodor

The effect of a powder coating comprising a starch powdered lubricant and a perfume microcapsule active agent on pouch malodor was evaluated. In this example, malodor was imparted to scent-free pouches to represent malodor that might be produced from a water-soluble film or components packaged within water-soluble films during storage. The pouches were coated with a powder comprising a powdered lubricant (starch) and an active agent (perfumed microcapsules) and the effect of the perfume microcapsules were determined by evaluation by a sensory panel. Five types of pouches were evaluated, including: non-coated, malodor-free pouches (designated "blank"); starch coated, malodor-free pouches (designated "only starch"); starch coated, malodor pouches (designated "malodor+starch"); and pouches treated with malodor and coated with a starch/perfume microcapsules(PMC) powder at two concentrations, 25% of starch by weight (designated "malodor+starch+PMC") and 50% of starch by weight (designated "malodor+starch+PMC 2X").

The pouches evaluated were 0.6 fl. oz. Triple Action Purex© Ultrapacks (Free and Clear) manufactured by The Dial Corporation (Scottsdale, Ariz.). Pouches were packaged in stand-up bags (18 pouches/bag) with dimensions of 185 mm×210 mm. The volume of the bags was 2.2 L without the pouches, headspace in the bag with the pouches was found to be 1.9 L. The "blank" pouches were used as received. Pouches were treated with malodor by dropping into the stand-up bags, cotton balls infused with 200 µl of an aqueous (deionized water) tert-butanethiol (TBT) solution having a TBT concentration of 300 µl/l. The starch or starch and perfumed microcapsule mixture were then added to the pouches.

The starch carrier powder used was a 28 µm foodgrade starch-based printing press powder. The "starch only" and the "malodor+starch" pouches were coated with the carrier powder by adding 0.25 g of starch to stand-up bags containing malodor-free pouches and malodor-treated pouches, respectively. The bags were sealed using zip seal fitments on the individual bags and were stored overnight.

The perfume microcapsules used were melamine formaldehyde capsules with a perfume oil in the core. The mean diameter of the capsules was 18 µm. The perfume microcapsules were obtained as a slurry in water; the slurry was spray-dried using a dual fluid melt spray prior to incorporation of the microcapsules into the starch carrier powder. The dried perfume microcapsules were combined with the starch prior to introduction to stand-up bags containing malodor treated pouches. A measure of 0.0625 g of dried perfume microcapsules was added to 0.25 g of starch and the mixture was added to stand-up bags of malodor-treated pouches to form the "malodor+starch+PMC" pouches. A double measure (0.125 g) of dried perfume microcapsules was added to 0.25 g of starch and the mixture added to stand-up bags of malodor-treated pouches to form the "malodor+starch+PMC 2X" pouches. The bags were sealed using zip seal fitments on the individual bags and were stored overnight.

Fourteen panelists were given the sample bags with random numbering and asked to evaluate the odor from the headspace of the bags on a scale of very bad to very good (very bad, bad, slightly bad, neutral, slightly good, good, very good). The responses were given a numerical value from 1 (very bad) to 7 (very good).

FIG. 1 shows the interval plot of the numerical value (and 95% confidence interval) of the odor perceived from each pouch type. The "blank" and "only starch" samples were not perceived to be significantly different from each other by the sensory panel. The "Malodor+starch" was perceived significantly below the no-effect value of 4, with the mean and the 95% confidence interval below 4. All of the pouches treated with the perfume microcapsule/starch mixture ("malodor+starch+PMC" and "malodor+starch+PMC 2X") showed positive effects on the panelists with mean values and 95% confidence intervals significantly higher than the no-effect value of 4. The odor perceived at 50% perfume microcapsule loading was slightly better than the odor perceived at 25% perfume microcapsule loading. Thus, the Example demonstrates that the functionalized powder is able to overcome malodor.

What is claimed:

1. A water-soluble packet, comprising:
a water-soluble film in the form of a packet; and
a powder coating on the film in the form of a packet, the coating consisting of a powder comprising
a powdered lubricant and
an active agent,
wherein the active agent is microencapsulated by a microcapsule and the powdered lubricant is not the same as the microcapsule and the active agent is selected from the group consisting of enzymes, flavors, colorants, pesticides, fertilizers, activators, acid catalysts, metal catalysts, ion scavengers, bleaches, bleach components, fabric softeners, and combinations thereof.

2. The water-soluble packet of claim 1, wherein the active agent is microencapsulated in a wax, stearic acid, stearyl alcohol, glyceryl stearates, or polymeric microcapsule.

3. The water-soluble packet according to claim 1, wherein the powdered lubricant is selected from the group consisting of starches, modified starches, silicas, siloxanes, calcium carbonate, magnesium carbonate, clay, talc, silicic acid, gypsum, zeolites, cylclodextrins, calcium stearate, zinc stearate, alumina, magnesium stearate, alumina, zinc oxide and combinations thereof.

4. The water-soluble packet according to claim 3, wherein the powdered lubricant is kaolin.

5. The water-soluble packet according to claim 1, wherein the active agent is not a zeolite.

6. The water-soluble packet of claim 2, wherein the microcapsule is characterized by one or more of the following release mechanisms: mechanical rupture, dissolution, diffusion, ablation, biodegradation, melt, or a pH triggered release mechanism.

7. The water-soluble packet of claim 1, wherein the powdered lubricant is characterized by a mean particle size in a range of about 1 µm to about 100 µm.

8. The water-soluble packet according to claim 2, wherein said microcapsule is selected from one or more of: melamine formaldehyde, polyurethane, urea formaldehyde, chitosan, poly methyl methacrylate, polystyrene, polysulfone, poly tetrahydrofuran, gelatin, gum arabic, starch, polyvinylpyrrolidone, carboxymethylcellulose, hydroxyethylcellulose, methylcellulose, arabinogalactan, polyvinyl alcohol, polyacrylic acid, ethylcellulose, polyethylene, polymethacrylate, polyamide, poly (ethylenevinyl acetate), cellulose nitrate, silicones, poly(lactideco-glycolide), paraffin, carnauba, spermaceti, beeswax, stearic acid, stearyl alcohol, glyceryl stearates, shellac, cellulose acetate phthalate, and zein.

9. The water-soluble packet according to claim 2, wherein the microcapsule is characterized by a mean particle size in a range of about 0.1 µm to about 200 µm.

10. The water-soluble packet according to claim 2, wherein the mean particle size of the microcapsule is greater than the mean particle size of the powdered lubricant, wherein the microcapsule is selected from one or more of the group consisting of melamine formaldehyde, polyurethane, urea formaldehyde, chitosan, polymethyl methacrylate, polystyrene, polysulfone, poly tetrahydrofuran, gelatin, gum arabic, starch, polyvinyl pyrrolidone, carboxymethylcellulose, hydroxyethylcellulose, methylcellulose, arabinogalactan, polyvinyl alcohol, polyacrylic acid, ethylcellulose, polyethylene, polymethacrylate, polyamide, poly (ethylenevinyl acetate), cellulose nitrate, silicones, poly(lactidecoglycolide), paraffin, carnauba, spermaceti, beeswax, stearic acid, stearyl alcohol, glyceryl stearates, shellac, cellulose acetate phthalate, and zein.

11. The water-soluble packet according to claim 2, wherein microcapsuled active agent comprises microcapsule agglomerate and the mean microcapsule agglomerate size is greater than the mean particle size of the powdered lubricant, wherein the microcapsule is selected from one or more of the group consisting of melamine formaldehyde, polyurethane, urea formaldehyde, chitosan, polymethyl methacrylate, polystyrene, polysulfone, polytetrahydrofuran, gelatin, gum arabic, starch, polyvinyl pyrrolidone, carboxymethylcellulose, hydroxyethylcellulose, methylcellulose, arabinogalactan, polyvinyl alcohol, polyacrylic acid, ethylcellulose, polyethylene, polymethacrylate, polyamide, poly(ethylenevinyl acetate), cellulose nitrate, silicones, poly(lactidoco-glycolide), paraffin, carnauba, spermaceti, beeswax, stearic acid, stearyl alcohol, glyceryl stearates, shellac, cellulose acetate phthalate, and zein.

12. The water-soluble packet according to claim 1, wherein the powder coating comprises about 1 wt % to about 99 wt % active agent.

13. The water-soluble packet according to claim 1, wherein the powder coating comprises about 1 wt % to about 99 wt % powdered lubricant.

14. The water-soluble packet according to claim 1, wherein the powder coating is present on the film in the form of a packet in an amount in a range of about 0.01 mg/cm2 to about 10 mg/cm2.

15. The water-soluble packet according to claim 1, wherein the water-soluble film comprises a material selected from the group consisting polyvinyl alcohol, modified polyvinyl alcohols, polyacrylates, water-soluble acrylate copolymers, methylcellulose, carboxymethylcellulose, dextrin, ethylcellulose, hydroxyethylcelleulose, hydroxypropyl methylcellulose, malodextrin, polymethacrylates, polyvinyl alcohol copolymers, hydroxypropyl methyl cellulose, polyvinyl pyrrolidone, polyalkylene oxides, acrylamide, acrylic acid, and combinations thereof.

16. The water-soluble packet according to claim 1, further comprising a solid, liquid, or gel composition enclosed within the water-soluble packet.

17. The water-soluble packet according to claim 16, wherein the enclosed composition comprises a laundry detergent, a bleach, a fabric care composition, a dishwashing composition, a hard surface cleaning composition, a beauty care composition, a skin care composition, a personal care composition, or a food product composition, or any combination thereof.

18. The water-soluble packet according to claim 16, wherein the active agent is capable of a chemical reaction with a component of the composition enclosed within the water-soluble packet.

19. The water-soluble packet according to claim 18, wherein the active agent is capable of a chemical reaction with a component of the composition enclosed within the water-soluble packet in an aqueous solution.

20. The water-soluble packet according to claim 16, wherein either the active agent is unstable in the presence of a component of the composition enclosed within the water-soluble packet, or a component of the composition enclosed within the water-soluble packet is unstable in the presence of the active agent, or both the active agent and a component of the composition enclosed within the water-soluble packet are unstable in the presence of each other.

21. The water-soluble packet according to claim 19, wherein
the composition enclosed within the water-soluble packet comprises a percarbonate; and
the active agent comprises tetraacytylethylenediamine (TAED).

22. The water-soluble packet according to claim 20, wherein the composition enclosed within the packet comprises a first enzyme, the active agent comprises a second enzyme, and the first enzyme and second enzyme are unstable in the presence of each other.

23. A water-soluble packet, comprising:
a water-soluble film in the form of a packet; and
a powder coating on the film in the form of a packet, the powder coating comprising:
a powdered lubricant and
a microencapsulated active agent microencapsulated by a microcapsule, provided that when the active agent is a fragrance the fragrance is microencapsulated in a wax, stearic acid, stearyl alcohol, glyceryl stearates, or polymeric microcapsule,
wherein the powdered lubricant is not the same as the microcapsule and the powder coating consists of powder, and the active agent is selected from the group consisting of enzymes, flavors, colorants, fragrances, pesticides, fertilizers, activators, acid catalysts, metal catalysts, ion scavengers, bleaches, bleach components, fabric softeners, and combinations thereof.

24. The water-soluble packet of claim 23, wherein the active agent is not a zeolite.

25. The water-soluble packet according to claim 1, wherein the active agent is selected from the group consisting of enzymes, flavors, colorants, pesticides, activators, acid catalysts, metal catalysts, bleaches, bleach components, fabric softeners, and combinations thereof.

26. The water-soluble packet according to claim 20, wherein the composition enclosed within the packet comprises a first enzyme, the active agent comprises a second enzyme, and the first enzyme and second enzyme are unstable in the presence of each other.

* * * * *